(12) United States Patent
Muneda et al.

(10) Patent No.: US 11,346,398 B2
(45) Date of Patent: May 31, 2022

(54) SLIDING BEARING, BEARING APPARATUS, AND IMAGE FORMING APPARATUS

(71) Applicant: NTN CORPORATION, Osaka (JP)

(72) Inventors: Norikazu Muneda, Mie (JP); Kazuo Hirose, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 16/963,019

(22) PCT Filed: Jan. 17, 2019

(86) PCT No.: PCT/JP2019/001176
§ 371 (c)(1),
(2) Date: Jul. 17, 2020

(87) PCT Pub. No.: WO2019/142843
PCT Pub. Date: Jul. 25, 2019

(65) Prior Publication Data
US 2020/0340522 A1    Oct. 29, 2020

(30) Foreign Application Priority Data

Jan. 17, 2018 (JP) .............................. JP2018-005277
Jan. 16, 2019 (JP) .............................. JP2019-005352

(51) Int. Cl.
*F16C 33/20*    (2006.01)
*F16C 17/02*    (2006.01)
*F16C 17/24*    (2006.01)

(52) U.S. Cl.
CPC ............ *F16C 33/201* (2013.01); *F16C 17/02* (2013.01); *F16C 17/243* (2013.01);
(Continued)

(58) Field of Classification Search
CPC ........ F16C 17/02; F16C 17/10; F16C 17/243; F16C 33/08; F16C 33/1065; F16C 33/201;
(Continued)

(56) References Cited

U.S. PATENT DOCUMENTS 4,630,945 A * 12/1986 Gerling .................. F16C 35/02
                                                            384/320
6,467,965 B1 * 10/2002 Wyer ..................... F16C 33/08
                                                            384/295
(Continued)

FOREIGN PATENT DOCUMENTS

CN     102279542 A    12/2011
CN     103814226 A    5/2014
(Continued)

OTHER PUBLICATIONS

Machine Translation of JP 4669104B dated Oct. 10, 2001.
(Continued)

*Primary Examiner* — Alan B Waits
(74) *Attorney, Agent, or Firm* — Hedman & Costigan, P.C.; James V. Costigan; Kathleen A. Costigan

(57) ABSTRACT

To provide a non-oil-impregnated sliding bearing having superior low friction capable of suppressing an increase of a shaft temperature in a continuous use, and a bearing apparatus and an image forming apparatus provided with the sliding bearing. Sliding bearings 5a to 5c support rotation shafts on cylinder inner surface in a rotatable manner. Each of the sliding bearings 5a to 5c is formed of a molded member of a non-oil-impregnated resin composition that does not contain oil. The resin composition contains an injection-moldable ultrahigh molecular weight polyethylene resin as a base resin, a polytetrafluoroethylene resin as an additive, and an acicular inorganic filler having Mohs hardness of 3 or less. The resin composition contains 65 vol %

(Continued)

or more of the ultrahigh molecular weight polyethylene resin, 5-25 vol % of the polytetrafluoroethylene resin, and 1-20 vol % of the acicular inorganic filler, based on the whole of the resin composition.

13 Claims, 18 Drawing Sheets

(52) U.S. Cl.
CPC ...... *F16C 2202/04* (2013.01); *F16C 2208/02* (2013.01); *F16C 2208/32* (2013.01); *F16C 2208/78* (2013.01); *F16C 2324/16* (2013.01)

(58) Field of Classification Search
CPC ...... F16C 37/00; F16C 35/02; F16C 2202/04; F16C 2208/02; F16C 2208/32; F16C 2208/78; F16C 2324/00; F16C 2324/16; B41J 29/377
See application file for complete search history.

(56) References Cited

U.S. PATENT DOCUMENTS

| | | | | |
|---|---|---|---|---|
| 7,073,947 | B2* | 7/2006 | Kobayashi | F16C 33/103 384/279 |
| 7,670,054 | B2* | 3/2010 | Fedotov | F16C 23/04 384/202 |
| 7,937,027 | B2* | 5/2011 | Kato | G03G 9/0827 399/256 |
| 8,888,371 | B1* | 11/2014 | Peterson | F16C 17/04 384/313 |
| 9,007,868 | B2* | 4/2015 | Matsui | G11C 7/1093 365/233.1 |
| 9,512,811 | B2* | 12/2016 | Oki | F02M 53/00 |
| 2005/0091829 | A1* | 5/2005 | Yoon | F16C 33/08 29/509 |
| 2007/0177833 | A1* | 8/2007 | Egami | F16C 33/1065 384/279 |
| 2011/0305477 | A1 | 12/2011 | Sakurai et al. | |
| 2013/0259545 | A1* | 10/2013 | Hata | F16C 35/02 399/328 |
| 2014/0226927 | A1 | 8/2014 | Ishii et al. | |
| 2016/0341251 | A1 | 11/2016 | Yoshizuka et al. | |
| 2017/0298991 | A1* | 10/2017 | Cedrone | F16C 35/02 |
| 2017/0370408 | A1* | 12/2017 | Li | F16C 13/02 |

FOREIGN PATENT DOCUMENTS

| | | |
|---|---|---|
| CN | 105980723 A | 9/2016 |
| EP | 2395400 A | 12/2011 |
| EP | 2759728 A | 7/2014 |
| EP | 3104029 A | 12/2016 |
| JP | 60-107418 U | 7/1985 |
| JP | 9-257048 A | 9/1997 |
| JP | 10-281142 A | 10/1998 |
| JP | 11-160644 A | 6/1999 |
| JP | 4669104 B | 10/2001 |
| JP | 2003-020408 A | 1/2003 |
| JP | 5456960 B | 4/2009 |
| JP | 2011-257703 A | 12/2011 |
| JP | 2013-79714 A | 5/2013 |
| JP | 2015-148285 A | 8/2015 |
| WO | 2013/042715 A | 3/2013 |
| WO | 2015/119231 A | 8/2015 |

OTHER PUBLICATIONS

Machine Translation of JP 5456960B dated Apr. 16, 2009.
Machine Translation of JP 2003-020408A dated Jan. 24, 2003.
Machine Translation of JP 9-257048A dated Sep. 30, 1997.
Machine Translation of JP 2015-148285A dated Aug. 20, 2015.
Machine Translation of CN 105980723A dated Sep. 28, 2016.
Machine Translation of JP 2013-79714A dated May 2, 2013.
Machine Translation of CN 103814226A dated May 21, 2014.
Machine Translation of JP 60-107418U dated Jul. 22, 1985.
Machine Translation of JP 10-281142A dated Oct. 20, 1998.
Machine Translation of JP 2011-257703A dated Dec. 22, 2011.
Machine Translation of JP 102279542A dated Dec. 14, 2011.
Machine Translation of JP 11-160644A dated Jun. 18, 1999.
Supplementary European Search Report issued in the corresponding European Patent Application—dated Aug. 31, 2021.

* cited by examiner

SLIDING BEARING, BEARING APPARATUS, AND IMAGE FORMING APPARATUS

TECHNICAL FIELD

The present invention relates to a sliding bearing, and, in particular, to a sliding bearing used to support various types of rollers and shafts in a developer unit, a photoreceptor unit, a transfer unit, a paper ejector unit, a paper feeder unit, or the like, of an image forming apparatus such as a copier, a multifunction machine, a printer (a laser printer, an inkjet printer, or the like), and a fax machine. The present invention also relates to a bearing apparatus and an image forming apparatus provided with the sliding bearing.

BACKGROUND ART

An image forming apparatus such as a copier and a printer is provided with a rotatable developer roller that develops a latent electrostatic image formed on a photoreceptor drum, and a supply roller arranged to contact the developer roller so as to supply toner. The image forming apparatus transfers the toner to the latent electrostatic image on the photoreceptor drum using the developer roller and the supply roller and then transfers the toner on the photoreceptor drum onto a paper to fix the toner using heat and pressure. A developer apparatus of the image forming apparatus uses rollers such as a stir roller that stirs the toner, a charge roller that charges the tonner, and the developer roller and the supply roller described above that supply the tonner to the photoreceptor drum. Rotation shafts of the rollers are supported by a bearing apparatus.

High speed and power consumption reduction of the copier and the printer have progressed year by year, and thereby the bearing is desired to endure heavy load and high speed, to achieve low torque and to improve wear resistance. Further, downsizing, weight reduction, superior usability and cost reduction of the apparatus are also desired. Especially in recent years, a temperature for fixing the toner has been lowered in the image forming apparatus in order to achieve low energy consumption. Further, the developer apparatus installed in the apparatus has progressed to use a toner process cartridge, considering usability, downsizing, detachable performance and the like.

Examples of the bearing used in a sliding part of such an image forming apparatus include a ball bearing that supports the rotation shaft, and a sliding bearing in which the rotation shaft rotates while sliding on a sliding contact surface of the bearing. The ball bearing can be used for a shaft to which relatively heavy load is applied, and also an influence of heat to the shaft is small because of its low friction and low temperature performance. However, the structure of the ball bearing is complex and high in cost. Thus, a sliding bearing such as an oil-impregnated sintered sliding bearing and a resin sliding bearing is mostly adopted instead of the rolling bearing. The sliding bearing is simple in structure and low in cost compared to the ball bearing, and therefore various sliding bearings have been proposed.

For example, Patent document 1 discloses a sliding bearing formed by molding a resin composition that contains 65-75 mass % of polyamide (PA) resin and 25-35 mass % of modified polyethylene resin. Further, Patent document 2 discloses a sliding bearing formed by a composition including self-lubricating thermoplastic olefin-based resin as a base material. Patent Document 2 also discloses that Rockwell hardness of the sliding bearing is in a range between 51 and 58 and Rockwell hardness/bending elastic modulus (GPa) is in a range between 25 and 45. Further, Patent Document 3 discloses a sliding bearing including thermoplastic olefin-based resin or polyacetal (POM) resin impregnated with low viscosity oil such as silicon oil.

Further, in order to achieve low temperature for fixing the toner, a measure in which a developed part is arranged away from a heat source, for example, a fuser part that fixes the toner onto a paper, or a measure that forcibly cools the developed part using a cooling apparatus has been adopted. For example, Patent Document 4 discloses a bearing structure of an image forming apparatus using a sliding bearing. The bearing structure is provided with a rotation member having a blade, and a ventilation hole so as to perform the cooling using an air flow generated by the rotation member.

PRIOR ART DOCUMENTS

Patent Documents

Patent Document 1: JP 4669104 B
Patent Document 2: JP 5456960 B
Patent Document 3: JP 2003-020408 A
Patent Document 4: JP H09-257048 A

SUMMARY OF THE INVENTION

Problems to be Solved by the Invention

The sliding bearing is simple in structure compared to the ball bearing, and therefore a thin wall design can be adopted. This configuration derives downsizing and weight reduction of the image forming apparatus. However, friction of the sliding bearing is larger than that of the ball bearing, and therefore the temperature around the rotation shaft is apt to be high due to the friction heat. The toner in the developer unit is sensitive to a temperature change, and sticking, aggregating and failure in flowing are caused due to an increase of a peripheral temperature. Thus, a configuration using the sliding bearing is apt to be inferior in printing performance using the toner compared to a configuration using the ball bearing. Further, the configuration using the sliding bearing is short in continuous paper feeding time compared to the configuration using the ball bearing, and therefore the configuration using the sliding bearing is apt to be inferior in usability.

Against this, for example, the sliding bearing disclosed in Patent Document 1 derives a low friction effect and a low heat generation effect to a certain extent when used in a circumstance considering the developer unit, however such effects are not sufficient. Specifically, a shaft temperature might be increased to a sticking start temperature of the toner (approximately 50° C.) due to the friction heat of the sliding bearing.

Further, the sliding bearing disclosed in Patent Document 2 might be insufficient in suppressing an abnormal noise when used in a circumstance considering the developer unit. Also, a kinetic friction coefficient is not low enough, and thereby the friction heat of the sliding bearing is generated to a certain extent. Accordingly, a shaft temperature of the rotation shaft formed of stainless (SUS) might be increased above 50° C. in a continuous use. Thus, in a case in which the image forming apparatus is continuously used, a stop control unit that intentionally sets a cooling time for the developer unit is needed, and therefore there is a room for improvement of the performance of the sliding bearing.

Further, the oil-impregnated sliding bearing disclosed in Patent Document 3 is superior in low friction performance to a SUS shaft, however oil shortage might be caused in a long-term use or management of an oil-impregnated amount in mass production might be difficult, so that the mass production is unsuitable. Further, a complicated structure disclosed in Patent Document 4 might be difficult in downsizing and obtaining sufficient strength.

An object of the present invention is, in order to solve such problems, to provide a non-oil-impregnated sliding bearing having superior low friction performance capable of suppressing an increase of a shaft temperature in a continuous use, and a bearing apparatus and an image forming apparatus provided with the sliding bearing. Another object of the present invention is to provide a sliding bearing having a relatively simple structure capable of suppressing an increase of a rotation shaft temperature and an increase of a bearing temperature, and also having superior cooling speed, and a bearing apparatus and an image forming apparatus provided with the sliding bearing.

Means for Solving the Problems

A sliding bearing according to the present invention is formed such that a cylinder inner surface thereof supports a rotation shaft in a rotatable manner. The sliding bearing is formed of a molded member of a non-oil-impregnated resin composition that does not contain oil. The resin composition contains an injection-moldable ultrahigh molecular weight polyethylene (ultrahigh molecular weight PE) resin as a base resin, a polytetrafluoroethylene (PTFE) resin as an additive and an acicular inorganic filler having Mohs hardness of 3 or less.

In the sliding bearing, the resin composition may contain 65 vol % or more of the ultrahigh molecular weight PE resin, 5-25 vol % of the PTFE resin, and 1-20 vol % of the acicular inorganic filler, based on the whole of the resin composition.

The sliding bearing may be used in a developer unit of an image forming apparatus. In particular, the sliding bearing may be formed to support a roller in a toner cartridge of the developer unit of the image forming apparatus. The toner cartridge may include a toner process cartridge including a photoreceptor or the like. Further, the sliding bearing may be an injection-molded member integrally molded from the resin composition.

The sliding bearing may be a cylindrical sliding bearing with a flange formed on a cylinder end part thereof, and a recess or a projection for heat dissipation may be formed on a surface of the flange. In particular, at least one of a groove and a hole may be formed as the recess or the projection.

The groove may be formed on the surface of the flange, and a plurality of the grooves may be radially formed from an inner diameter side toward an outer diameter side of the flange. In this case, the hole may be formed on the surface of the flange, and the hole may be formed between the grooves radially formed. Further, the hole may be formed on the surface of the flange, and a plurality of the holes may be concentrically formed with respect to a cylinder center axis.

A bearing apparatus according to the present invention includes the sliding bearing according to the present invention, and a housing that houses the sliding bearing. The housing has a housing part into which the sliding bearing is inserted, and at least one of a groove for heat dissipation and a hole for heat dissipation on or around the housing part.

The housing part may have a circular through hole that penetrates the housing, and the housing may have a plurality of the grooves that is formed radially from an inner diameter side toward an outer diameter side of the through hole, around the through hole on one end surface on which the through hole is formed.

The housing part may have a through hole that penetrates the housing, and the housing may have a plurality of the holes that does not penetrate the housing, around the through hole on one end surface on which the through hole is formed.

The housing part may have a cylindrical member with an inner peripheral part into which the sliding bearing is inserted and the groove formed on an outer peripheral part of the cylindrical member, and a plurality of the grooves that is formed linearly or spirally from one end to the other end along an axial direction of the cylindrical member.

The housing may be one component that forms a toner cartridge of a developer unit of an image forming apparatus, and the sliding bearing may be formed to support a roller in the toner cartridge. Further, the housing may be an injection-molded member integrally molded with the groove or the hole from a resin composition.

An image forming apparatus according to the present invention includes the sliding bearing according to the present invention, and a roller or a shaft supported by the sliding bearing.

Effect of the Invention

The sliding bearing according to the present invention is formed of the molded member of the non-oil-impregnated resin composition that does not contain oil, the resin composition containing the injection-moldable ultrahigh molecular weight polyethylene (ultrahigh molecular weight PE) resin as a base resin, the polytetrafluoroethylene (PTFE) resin as an additive and the acicular inorganic filler having Mohs hardness of 3 or less. This configuration eliminates the need for a concern for the oil shortage even in a long-term use. Further, the non-oil-impregnated sliding bearing is superior in low friction performance because of a self-lubrication property of the ultrahigh molecular weight PE resin and a lubrication film caused by the PTFE resin on a surface of the rotation shaft, which is a mating member. Consequently, the sliding bearing of the present invention is lower in friction than the conventional sliding bearing, and therefore the temperature of the rotation shaft formed of SUS or the like is less likely to increase and the increase of the shaft temperature is suppressed even in a continuous use.

The PTFE resin is superior in heat resistance and the thermal decomposition temperature thereof is 300° C. or more. Accordingly, the thermal decomposition in the injection molding can be suppressed. Further, a transfer layer superior in self-lubrication is formed on a mating shaft in a use under a non-lubricated environment, and accordingly the low friction performance can be obtained by the transfer layer and the wear resistance of the bearing. Further, the configuration that appropriately contains the acicular inorganic filler having the Mohs hardness of 3 or less can improve the wear resistance and stably ensure a contact area of the bearing sliding surface, so that superior low friction performance can be obtained. As a result, the temperature of the rotation shaft formed of SUS or the like is further less likely to increase and thereby the toner in the developer unit is prevented from sticking so that the developer unit can preferably perform continuous operation.

The toner in the developer unit of the image forming apparatus is apt to stick due to the increase of the temperature around thereof. The sliding bearing according to the present invention is formed of the resin composition and therefore the shaft temperature is less likely to increase.

Accordingly, in a case in which the sliding bearing according to the present invention is used in the developer unit, the continuous operation is possible without causing the sticking of the toner.

The sliding bearing according to the present invention is the cylindrical sliding bearing with the flange formed on the cylinder end part thereof, and the recess or the projection for heat dissipation is formed on the surface of the flange. With this configuration, the temperature increasing speed of the rotation shaft to be supported can be made slow and the temperature thereof can be suppressed to be low in the continuous use after the temperature has been increased, compared to a configuration without the recess or the projection for heat dissipation. Further, the cooling speed after stopping the operation can be made fast, and the aggregating of the toner can be further suppressed. In a case in which the rotation shaft is formed of resin, it can be expected not to cause the irregular rotation due to the fusion or the sticking of the resin sliding bearing and the resin rotation shaft caused by the friction heat.

The groove is formed as the recess or the projection on the surface of the flange, and a plurality of the grooves is radially formed from the inner diameter side toward the outer diameter side of the flange. This configuration keeps the cylinder inner surface, which is a bearing surface, as it is, so that the rotation shaft can be supported stably and the heat dissipation performance can be improved. In this case, a plurality of holes is formed between the grooves radially formed, so that the heat dissipation performance can be further improved.

The hole is formed as the recess or the projection on the surface of the flange, and a plurality of the holes is concentrically formed with respect to the cylinder center axis. This configuration, similar to the groove described above, keeps the cylinder inner surface, which is a bearing surface, as it is, so that the rotation shaft can be supported stably and the heat dissipation performance can be improved.

The sliding bearing is the injection-molded member integrally molded with the recess or the projection from the resin composition. This configuration can efficiently mold the flange integrally with the recess or the projection for heat dissipation (for cooling) on the flange of the bearing, so that superior productivity can be obtained.

The housing of the bearing apparatus according to the present invention has at least one of the groove for heat dissipation and the hole for heat dissipation on or around the housing part. With this configuration, the temperature increasing speed of the rotation shaft or the bearing can be made slow and the temperature thereof can be suppressed to be low in the continuous use after the temperature has been increased, compared to a configuration without the groove or the hole for heat dissipation. Further, the cooling speed after stopping the operation can be made fast, and the aggregating of the toner can be further suppressed. Thus, the bearing apparatus according to the present invention can further suppress the generation of the friction heat by a synergetic effect of the low friction property of the sliding bearing according to the present invention and the groove or the hole for heat dissipation of the housing, and thereby the shaft temperature can be made low. Consequently, the aggregating, the fusion or the like of the toner can be prevented. As a result, image failure can be favorably prevented.

The housing has a plurality of the grooves that is formed radially from the inner diameter side toward the outer diameter side of the through hole, around the through hole on one end surface on which the through hole is formed. This configuration keeps the through hole that houses the sliding bearing as it is, so that the sliding bearing can be housed stably and the heat dissipation performance can be improved.

The housing has a plurality of the holes that does not penetrate the housing, around the through hole on one end surface on which the through hole is formed. This configuration, similar to the groove described above, keeps the through hole that houses the sliding bearing as it is, so that the sliding bearing can be housed stably and the heat dissipation performance can be improved. Further, the hole does not penetrate the housing, and thereby the strength can be maintained.

The housing part has the cylindrical member with the inner peripheral part into which the sliding bearing is inserted and the groove formed on the outer peripheral part of the cylindrical member, and a plurality of the grooves is formed linearly or spirally from one end to the other end along the axial direction of the cylindrical member. This configuration, similar to the configuration described above, keeps the through hole that houses the sliding bearing as it is, so that the sliding bearing can be housed stably and the heat dissipation performance can be improved.

The housing to which the sliding bearing is assembled is the injection-molded member integrally molded with the groove or the hole from the resin composition. This configuration can efficiently mold the housing integrally with the groove or the hole for heat dissipation (for cooling) on the housing, so that superior productivity can be obtained.

MODE FOR CARRYING OUT THE INVENTION

Figure 1:
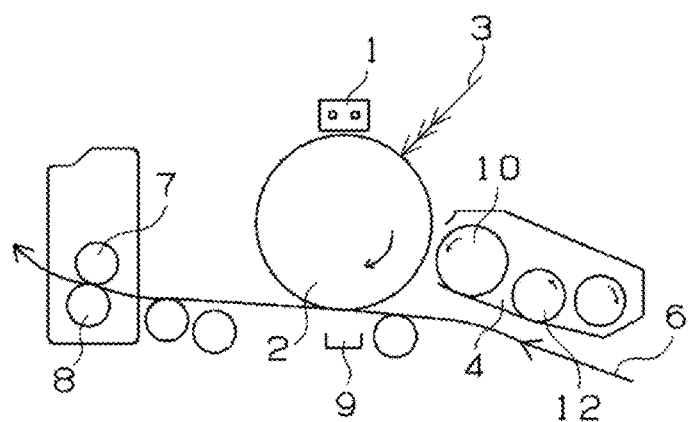
FIG. 1 is a schematic view illustrating a developer unit of an image forming apparatus.

An operation principle of a developer unit of an image forming apparatus such as a copier and a printer to which a sliding bearing of the present invention is applied will be described with reference to FIG. 1. FIG. 1 is a schematic view illustrating the developer unit of the image forming apparatus. A whole surface of a photoreceptor drum 2 is charged uniformly by a charge unit 1. In an exposure process, the charged photoreceptor drum 2 is irradiated with a laser beam 3 to form a pattern of a print data of an electric latent image on the surface of the photoreceptor drum. In the electric latent image, a charge of a part irradiated with the light is grounded and therefore the electric latent image is charged with an opposite charge to an apparent non-image part. The toner is stuck to the electric latent image. Next, a cartridge unit 4 stirs the toner using a stir roller 12 sticks the toner onto the latent image formed on the surface of the photoreceptor drum 2 through a developer roller 10. When a paper 6 is passing the vicinity of the surface of the photoreceptor drum 2 onto which the toner is provided, the opposite charge is applied from a back side of the paper using a charger 9 so as to transfer the toner on the photoreceptor drum 2 to the paper 6. The paper 6 is heated and pressured using a fuser roller 7 and a pressure roller 8 to fix the toner, which is transferred to the paper 6, on the paper. At this time, the toner is melted, pressured and fixed by the fuser roller 7 of which a surface temperature is 160-200° C.

Figure 2:
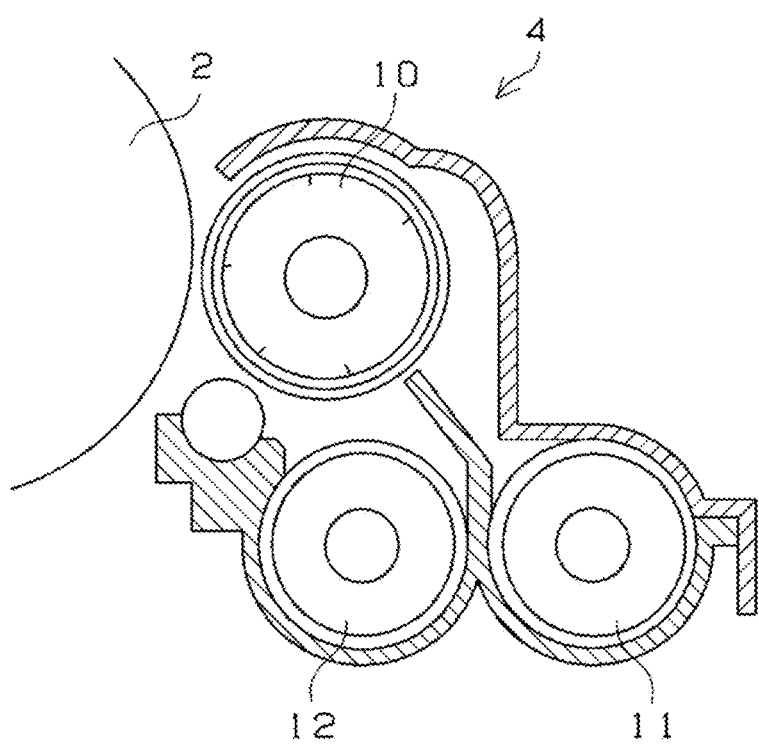
FIG. 2 is a schematic view illustrating a configuration of the developer unit of the image forming apparatus.
Figure 3:
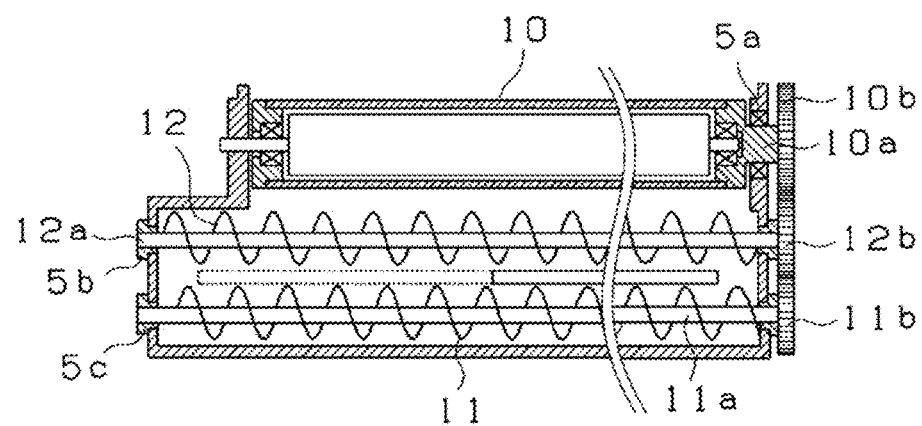
FIG. 3 is a cross-sectional schematic view illustrating the developer unit of the image forming apparatus.

A configuration of the developer unit of the image forming apparatus using the sliding bearing of the present invention will be described with reference to FIG. 2 and FIG. 3. FIG. 2 is a schematic view illustrating the configuration of the developer unit. FIG. 3 is a cross-sectional schematic view illustrating the developer unit. As shown in FIG. 2, in the developer unit, the toner is supplied to the stir roller 12 using a supply roller 11 in the toner cartridge 4, and then the charged toner is transferred to the latent image on the photoreceptor drum 2 through the developer roller 10.

Rollers, rotation shafts, and sliding bearings will be described with reference to FIG. 3. As shown in FIG. 3, the toner is supplied to the stir roller 12 using the supply roller 11. The supply roller 11 is rotated by driving a rotation shaft 11a through a driving gear 11b. The rotation shaft 11a is supported by a sliding bearing 5c. The toner supplied to the stir roller 12 is stirred and supplied to the developer roller 10. The stir roller 12 is, similar to the supply roller, rotated by driving a rotation shaft 12a through a driving gear 12b. The rotation shaft 12a is supported by a sliding bearing 5b. The developer roller 10 causes the toner supplied from the stir roller 12 to stick onto the latent image formed on the surface of the photoreceptor drum. The developer roller 10 is rotated by driving a rotation shaft 10a through a driving gear 10b. The rotation shaft 10a is supported by a sliding bearing 5a. Each of the sliding bearings 5a, 5b and 5c is formed as a substantially cylindrical component to support each of the rotation shafts 10a, 11a and 12a by a cylinder inner surface in a rotatable manner.

A material of the rotation shaft 10a of the developer roller 10 is a nonmagnetic material. For example, aluminum or aluminum alloy (A5052, A5056, A6063), which are nonferrous metals, or a synthetic resin such as a POM resin may be adopted. Further, a material of the rotation shaft 12a of the stir roller 12 and the rotation shaft 11a of the supply roller 11 is metal such as SUS-based metal and free cutting steel or resin. Especially in recent years, the stir roller 12 and the supply roller 11 including the bearings thereof have been formed of resin because it is low in cost and superior in molding performance. A structure in which each of the stir roller and the supply roller is formed of resin and a SUS-based metal sleeve is fitted into a bearing sliding part has been increased in order to improve the strength and to consider the fitting with the rolling bearing.

When supplying the toner to the photoreceptor drum 2, the rollers 10, 11 and 12 rotates and thereby the rotation shafts 10a, 11a and 12a and the sliding bearings 5a, 5b and 5c slide to each other, so that friction heat (sliding heat) is generated. When the sliding heat exceeds the softening point of the toner, aggregating or sticking of the toner, which largely affects the quality of the image, is caused.

Figure 4:
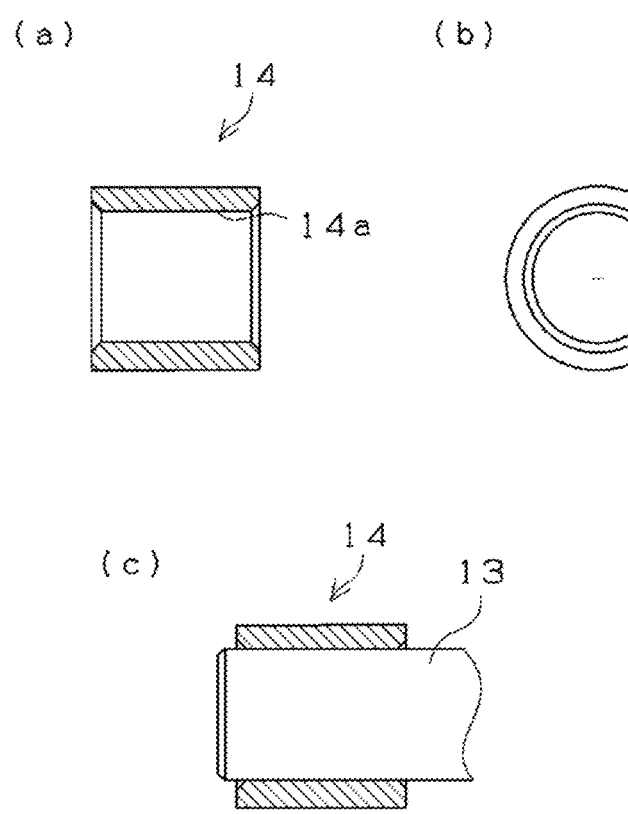
FIGS. 4(a) to 4(c) are cross-sectional views and the like illustrating one example of a sliding bearing according to the present invention.

The sliding bearing of the present invention is a molded member of a resin composition formed as a substantially cylindrical member. One example of the sliding bearing of the present invention will be described with reference to FIGS. 4(a) to 4(c). FIG. 4(a) is an axial direction cross-sectional view of the sliding bearing. FIG. 4(b) is a front view seen from a side of a flange. FIG. 4(c) is a cross-sectional view of the sliding bearing supporting a rotation shaft. As shown in FIGS. 4(a) to 4(c), in a sliding bearing 14 according to this example, a main body is formed as a cylinder of which a cylinder inner surface 14a supports a rotation shaft 13 in a rotatable manner.

The resin composition adopted in the sliding bearing of the present invention contains an injection-moldable ultrahigh molecular weight PE resin as a base resin (matrix), a PTFE resin as an additive, and an acicular inorganic filler having Mohs hardness of 3 or less. The present inventors found that the resin composition containing the injection-moldable ultrahigh molecular weight PE resin as a base resin to which the PTFE resin as an additive is added can obtain a low friction coefficient of non-oil-impregnated composition because of a synergistic effect of a lubrication film formed of the PTFE resin to a mating shaft surface and a self-lubrication property of the ultrahigh molecular weight PE resin. Further, the preset inventors found that the resin composition to which the acicular inorganic filler having Mohs hardness of 3 or less is added can improve wear resistance and stably ensure a contact area of a bearing sliding surface. Further superior low friction performance and less heat generation performance can be obtained also under a condition of high speed and high surface pressure (for example, 1.0 MPa, 0.25 m/s). The present invention is based on such knowledge.

The ultrahigh molecular weight PE resin adopted in the present invention is an injection-moldable polyethylene (PE) resin having a weight average molecular weight of 100,000 or more. Many kinds of PE resins of which the molecular weight is from a low molecular weight to an ultrahigh molecular weight widely exist. However, the PE resin having the weight average molecular weight of 1,000,000 or more cannot be injection-molded, so that such PE resin cannot be adopted in the present invention. That is, the injection-moldable ultrahigh molecular weight PE resin in the present invention indicates the PE resin having the weight average molecular weight of 100,000-1,000,000. The weight average molecular weight is preferable in a range of 200,000-800,000, more preferable in a range of 250,000-

600,000. The PE resin having a straight chain structure or a branched chain structure including a methyl group may be adopted.

As the ultrahigh molecular weight PE resin, a high density ultrahigh molecular weight PE resin, which is superior in various properties of wear resistance, self-lubrication, impact resistance, chemical resistance, lightweight of which the specific gravity is lower than water, and size stability due to the low water absorbency, is preferable. The high density denotes a density (ASTM D 1505) of 942 kg/m$^3$ or more. An upper limit of the density of the high density ultrahigh molecular weight PE resin is less than 1,000 kg/m$^3$, in particular 980 kg/m$^3$.

The melt flow rate (MFR) based on JIS K 7210 (190° C., 10 kgf) of the ultrahigh molecular weight PE resin adopted in the present invention is preferable in a range of 1-30 g/10 min, more preferable in a range of 1-15 g/10 min. Further, as an injection-molding condition, for example, the molding temperature of 200-270° C., and the injection pressure of 100-160 MPa are adopted.

Examples of commercial products of the ultrahigh molecular weight PE resin adopted in the present invention include LUBMER L3000 produced by Mitsui Chemicals (density: 969 kg/m$^3$, MFR: 15 g/10 min), LUBMER L4000 produced by Mitsui Chemicals (density: 967 kg/m$^3$, MFR: 6 g/10 min), and LUBMER L5000 produced by Mitsui Chemicals (density: 966 kg/m$^3$, MFR: 2 g/10 min).

The ultrahigh molecular weight PE resin is contained in the resin composition by 65 vol % or more, preferably 65-90 vol %, and more preferably 70-80 vol %, based on the whole of the resin composition.

In the present invention, the PTFE resin used as an additive is a general PTFE resin represented by —(CF$_2$—CF$_2$)n-. Or alternatively, a modified PTFE resin in which a perfluoroalkylether group (—C$_p$F$_{2p}$—O—) (p is an integral number between 1 to 4), a polyfluoroalkyl group (H(CF$_2$)$_q$—) (q is an integral number between 1 to 20) or the like is introduced into the general PTFE resin can be adopted. The PTFE resin or the modified PTFE resin may be obtained by means of a suspension polymerization method that obtains general molding powder, or an emulsion polymerization method that obtains fine powder.

An average particle diameter (measured value by a laser analysis method) of the powder of the PTFE resin is not especially limited, however it is preferably set to 30 μm or less from a viewpoint of ensuring the surface smoothness.

The powder of the PTFE resin obtained by baking the PTFE resin at a temperature of its melting point or more may be adopted. The powder obtained by irradiating the baked powder with y rays or electron rays may be also adopted. The baked powder of the PTFE resin has excellent uniform dispersion performance in the resin composition and imparts excellent wear resistance to the molded member, compared to the unbaked PTFE resin (molding powder, fine powder).

The PTFE resin is contained in the resin composition by 5-25 vol %, preferably 10-20 vol %, more preferably 15-20 vol %, based on the whole of the resin composition. In case in which the content of the PTFE resin is less than 5 vol %, it is difficult to ensure the low friction performance and thereby the suppression of the temperature increase of the rotation shaft might be insufficient. While, in a case in which the content of the PTFE resin is more than 25 vol %, the wear resistance and the injection molding performance might be deteriorated.

The resin composition contains the acicular inorganic filler having Mohs hardness of 3 or less, as an additive. There are various shapes of the inorganic filler such as an acicular shape, a plate shape, a spherical shape, and a scaly shape. Of these inorganic fillers, the acicular inorganic filler is adopted because it can improve the elastic modulus and stably ensure the sliding area of the sliding surface. The contact area between the rotation shaft and the sliding bearing is decreased due to an uneven shape of the sliding surface derived from the acicular structure, and thereby an increase of the friction coefficient can be suppressed. In the present invention, the acicular shape corresponds to a shape with an aspect ratio (a ratio of a length of a long axis to a short axis of the inorganic filler) of 5-100. The aspect ratio is obtained by using an image processing apparatus, as an average of the aspect ratios of a plurality of the selected any inorganic fillers. The aspect ratio is preferable in a range of 5-50.

In a case in which the Mohs hardness is more than 3, the attackability to the mating shaft is concerned, and the friction coefficient is increased, so that an increase of the shaft temperature might be caused. Therefore, the inorganic filler having the Mohs hardness of 3 or less is adopted. While, in a case in which the Mohs hardness is too low, the inorganic filler is easily worn. Consequently, the Mohs hardness is preferable in a range of 2-3.

The Mohs hardness is a scale of hardness measured by scratching an object sequentially using ten reference materials. When the object gets a scratch mark by a certain reference material, the object is determined that the hardness thereof is lower than the certain reference material. The reference materials are, from lower hardness to higher hardness, 1: talc; 2: gypsum; 3: calcite; 4: fluorite; 5: apatite; 6: orthoclase feldspar; 7: quartz; 8: topaz; 9: corundum; and 10: diamond. For example, when the object does not get a scratch mark by gypsum (Mohs hardness of 2) while the object gets a scratch mark by calcite (Mohs hardness of 3), the hardness of the object is determined as 2.5. The Mohs hardness indicates a degree of hardness of an object when lateral force is applied, and therefore the Mohs hardness is suitable as a scale of wear of the sliding surface. The Mohs hardness can be measured by a known Mohs hardness measure.

Examples of the inorganic filler having the Mohs hardness of 3 or less include talc (Mohs hardness of 1), aluminum silicate (Mohs hardness of 2-2.5), magnesium hydroxide (Mohs hardness of 2-3), molybdenum disulfide (Mohs hardness of 1-2), tungsten trioxide (Mohs hardness of 2.5), tungsten disulfide (Mohs hardness of 1-2), calcium carbonate (Mohs hardness of 2-3), calcium sulfate (Mohs hardness of 1.5-2), magnesium sulfate (Mohs hardness of 2.5), and mica (Mohs hardness of 3). A fibrous shape, an acicular shape or a whisker of the inorganic filler described above is utilized. One kind of the acicular inorganic filler may be utilized, or alternatively two or more kinds of the acicular inorganic fillers may be utilized together.

The acicular inorganic filler having the Mohs hardness of 3 or less is contained in the resin composition by 1-20 vol %, preferably 5-15 vol %, more preferably 5-10 vol %, based on the whole of the resin composition.

Considering the above description, the most preferable configuration of the resin composition adopted in the present invention contains the ultrahigh molecular weight PE resin, the PTFE resin, and the acicular inorganic filler having the Mohs hardness of 3 or less. The resin composition contains the ultrahigh molecular weight PE resin having the weight average molecular weight of 250,000-600,000 by 70-80 vol %, the PTFE resin by 15-20 vol %, and the acicular inorganic filler by 5-10 vol %, based on the whole of the resin composition.

The molded member of the resin composition can suppress the friction coefficient to be small against the mating shaft, in particular either of a SUS shaft and a POM resin shaft, and thereby the heat generation is less and the increase of the shaft temperature can be further suppressed. Further, the friction coefficient can be made small and a bearing wear amount can be also suppressed in the SUS shaft under a condition of high speed and high surface pressure. An increase of the bearing wear amount denotes an increase of the contact area with the rotation shaft. As the contact area is increased, the friction coefficient is apt to be large. Accordingly, by adding the acicular inorganic filler having the Mohs hardness of 3 or less, the elastic modules and the wear resistance can be improved.

In a case in which conductivity of the sliding bearing is needed depending on the structure of the apparatus, a known conductivity imparting material such as carbon black and carbon nanotube may be added to the resin composition so as to impart the conductivity to the resin composition. The compounded amount of the conductivity imparting material is not especially limited as long as the desired conductivity can be imparted. For example, the conductivity imparting material is added to the resin composition by 0.03-5 wt %, preferably 0.3-3 wt %. The volume resistivity of the resin composition to which the conductivity is added is preferably set to $10^3$ Ω·cm or less.

The resin composition described above does not especially limit a method for forming the sliding bearing. The sliding bearing may be formed by machining that processes the molded member obtained by means of compression molding or extrusion molding, however the injection molding is preferable from a viewpoint of productivity and uniformity of the quality. The sliding bearing of the present invention is formed of an injection-molded member obtained by injection-molding the resin composition using the well-known injection molding apparatus.

The ultrahigh molecular weight PE resin adopted in the present invention has relatively small mechanical strength, while since the ductility thereof is superior, the ultrahigh molecular weight PE resin has a property that hardly causes the damage of the sliding bearing.

Figure 5:
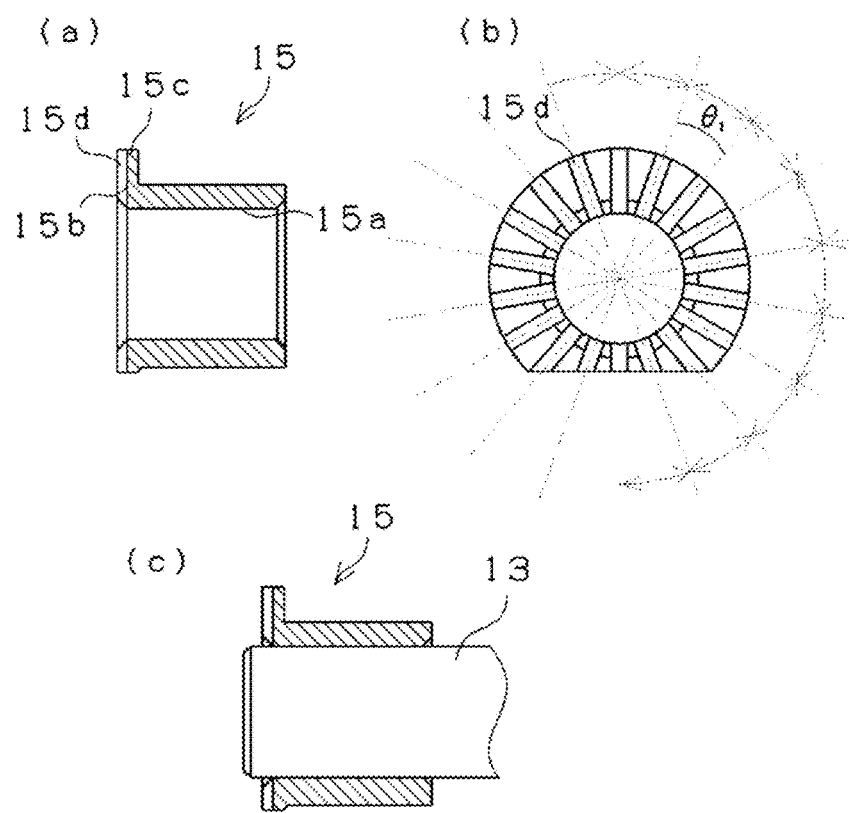
FIGS. 5(a) to 5(c) are cross-sectional views and the like illustrating another example of the sliding bearing according to the present invention.

Another example of the structure of the sliding bearing of the present invention will be described with reference to FIGS. 5(a) to 5(c). The sliding bearing shown in FIGS. 5(a) to 5(c) is a cylindrical sliding bearing with a flange on a cylinder end part thereof. A recess or a projection for heat dissipation is formed on a surface of the flange. Either of or both of the recess and the projection may be formed. The surface area is increased due to the recess and the projection, and thereby the heat dissipation performance from the flange is superior. Examples of the recess and the projection include a groove and a hole.

FIG. 5(a) is an axial direction cross-sectional view of the cylindrical sliding bearing with the flange. FIG. 5(b) is a front view seen from a side of the flange. FIG. 5(c) is a cross-sectional view of the sliding bearing supporting a rotation shaft. As shown in FIGS. 5(a) to 5(c), a sliding bearing 15 according to this example is a cylindrical sliding bearing with a flange, in which a main body is formed as a cylinder of which a cylinder inner surface 15a supports the rotation shaft 13 in a rotatable manner, and a flange 15c is formed on a cylinder end part 15b at one side. The flange 15c is formed to rise in an orthogonal direction to an axial line of the rotation shaft 13. A part of the flange 15c is notched in accordance with a member to which the sliding bearing is applied.

A groove 15d for heat dissipation is formed on a surface of the flange 15c. A plurality of the grooves 15d is formed radially from an inner diameter side (a side of the cylinder inner surface 15a) of the flange 15c toward an outer diameter side of the flange 15c. The flange 15c having the grooves 15d is served as a cooling fin, so that a temperature increasing speed of the rotation shaft temperature can be made slow in use and the temperature can be suppressed to be low in continuous use after the temperature has been increased. In the example shown in FIGS. 5(a) to 5(c), the groove is formed on the surface of the flange 15c, which is a flange face forming one end surface of the sliding bearing 15, however it is not limited to this. The groove may be formed on an opposite surface of the flange 15c.

The grooves 15d are arranged on the surface of the flange 15c to be shifted by regular angles $\theta_1$ as a center angle with respect to an axial line of the rotation shaft as the center. In this case, in a case in which the angle $\theta_1$ is 20 degrees, eighteen grooves are arranged, while in a case in which the angle $\theta_1$ is 30 degrees, twelve grooves are arranged. The number of the grooves is not especially limited, however in order to increase the surface area to enhance the heat dissipation performance, ten or more grooves are preferable, and fifteen or more grooves are more preferable.

A width size of the groove 15d in a circumferential direction is preferable in a range of 1-5% of an outer diameter size (not considering a notch or the like) of the flange 15c. The specific groove width depends on the number of the grooves, and for example, the groove width is preferable in a range of 0.1-0.8 mm, more preferably in a range of 0.3-0.6 mm. A depth of the groove 15d is set to be formed within the flange 15c, for example, the depth of the deepest part is preferable in a range of 0.1-1.0 mm, more preferable in a range of 0.3-0.6 mm. A chamfer of the groove 15d is preferably set in R or C 0.05-0.5 mm. Here, the depth of the groove denotes a distance between a groove formed surface of the flange and a groove bottom. In a case in which the groove is formed in a triangular groove or an arc groove, the depth of the deepest part of the groove is preferably set in the range described above.

Figure 6:
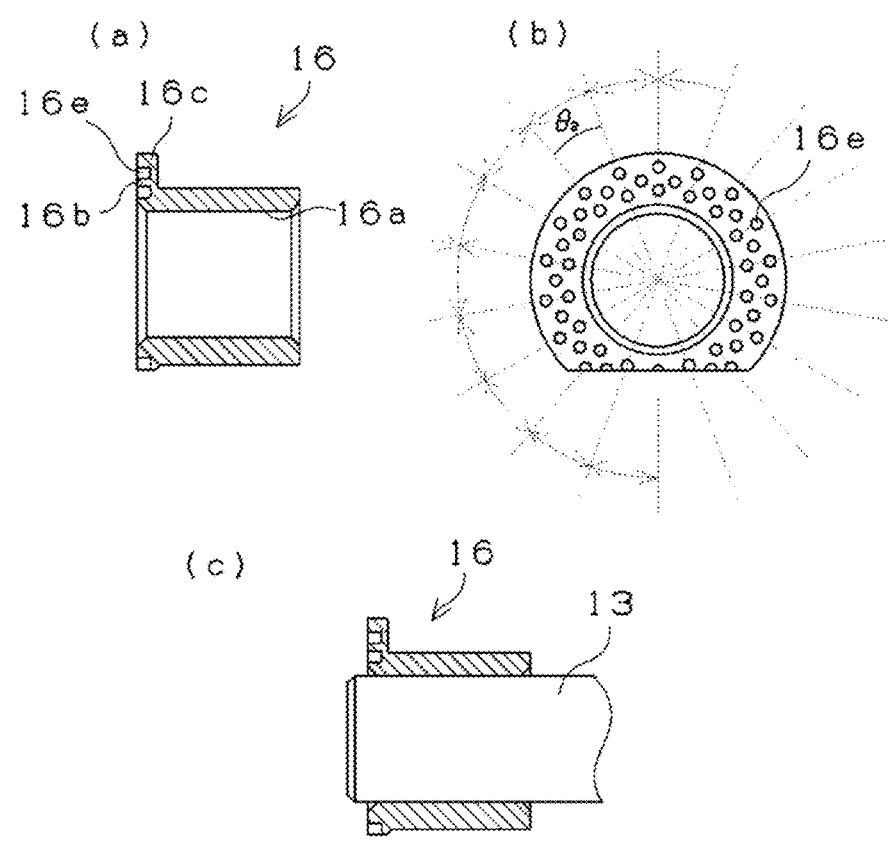
FIGS. 6(a) to 6(c) are cross-sectional views and the like illustrating another example of the sliding bearing according to the present invention.

Another example of the cylindrical sliding bearing with the flange will be described with reference to FIGS. 6(a) to 6(c). FIG. 6(a) is an axial direction cross-sectional view of the cylindrical sliding bearing with the flange. FIG. 6(b) is a front view seen from a side of the flange. FIG. 6(c) is a cross-sectional view of the sliding bearing supporting a rotation shaft. As shown in FIGS. 6(a) to 6(c), a sliding bearing 16 according to this example is, similar to the example shown in FIGS. 5(a) to 5(c), a cylindrical sliding bearing with a flange, in which a main body is formed as a cylinder of which a cylinder inner surface 16a supports the rotation shaft 13 in a rotatable manner, and a flange 16c is formed on an cylinder end part 16b at one side.

A plurality of holes 16e for heat dissipation is formed on a surface of the flange 16c. A plurality of the holes 16e is concentrically formed with respect to a cylinder center axis (axial line of the rotation shaft). Specifically, each two holes 16e formed in the radial direction are arranged on a surface at a side of the cylinder end part 16b of the flange 16c to be shifted by regular angles $\theta_2$ as a center angle with respect to the axial line of the rotation shaft as the center. Further, one hole 16e is arranged in an area corresponding to the angles $\theta_2$.

In the example shown in FIGS. 6(a) to 6(c), the hole 16e is formed as a non-through hole, however the hole 16e may be formed as a through hole. Further, in a case in which many holes are formed densely as shown in FIGS. 6(a) to 6(c), the hole 16e is formed as a non-through hole and a depth of the hole 16e is preferably set in a range of 50-90% of the flange 16c. The depth of the hole 16e denotes, similar to the groove, a distance between a hole formed surface of the flange and a hole bottom.

Further, the holes 16e may not be arranged in a geometric manner as shown in FIGS. 6(a) to 6(c) but arranged in a random manner. In either arrangement, the total area of the holes 16e is preferable in a range of 50-90% of the total area of the surface of the flange 16c, which is a hole formed surface, at a side of the cylinder end part 16b.

A plane shape of each of the holes 16e is a circular shape, and the size thereof is preferable in a range of φ0.1-1.5 mm. In the example shown in FIGS. 6(a) to 6(c), all holes 16e are identical in size, however the holes 16e having different sizes may be formed together.

In either example shown in FIGS. 5(a) to 5(c) and FIGS. 6(a) to 6(c), a shape in a depth direction of the groove or the hole may be determined as needed. For example, a rectangular groove or a rectangular hole having a rectangular section, an arc groove (R groove) or an arc hole having an arc section, or a triangular groove or a triangular hole having a triangular section may be adopted. By adopting the arrangement of the grooves or the holes shown in FIGS. 5(a) to 5(c) or FIGS. 6(a) to 6(c), the forced extraction in the injection molding is not caused in either of the rectangular shape, the arc shape and the triangular shape in the depth direction, and therefore the grooves or the holes are formed integrally with a main body of the bearing easily and a forming process for forming the grooves or the holes afterward is not needed.

Figure 7:
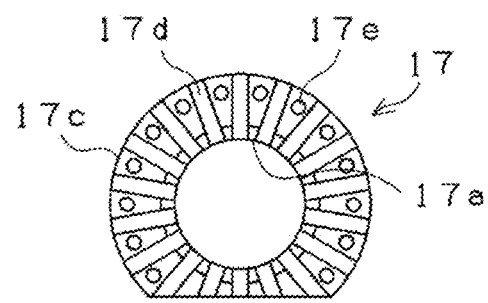
FIG. 7 is a front view illustrating another example of the sliding bearing according to the present invention.

Another example of the cylindrical sliding bearing with the flange will be described with reference to FIG. 7. FIG. 7 is a front view illustrating another example of the cylindrical sliding bearing with the flange seen from a side of the flange. As shown in FIG. 7, a sliding bearing 17 according to this example is, similar to the example shown in FIGS. 5(a) to 5(c), a cylindrical sliding bearing with a flange, in which a main body is formed as a cylinder of which a cylinder inner surface 17a supports the rotation shaft in a rotatable manner, and a flange 17c is formed on an cylinder end part at one side. Grooves 17d for heat dissipation, which are similar to those shown in FIGS. 5(a) to 5(c), are formed radially on the flange 17c. In this example, in addition to the grooves 17d, a plurality of holes 17e is formed a position other than the grooves 17d on the flange 17c. The holes 17e are formed between the grooves 17d radially arranged. With this, the heat dissipation performance can be further improved.

The cylindrical sliding bearing with the flange described above is preferably formed as an injection-molded member obtained by integrally molding the groove or the hole, which are the recess or the projection, and the flange by using the resin composition. While, the groove or the hole may be formed by machining after the injection molding. In order to improve the heat dissipation performance, the recess or the projection on the surface of the flange is preferably formed such that the total surface area of the flange including the recess or the projection is two times or more as large as that of the flange on which the recess or the projection is not formed.

In the sliding bearing of the present invention, a lubricant such as grease and lubrication oil may be provided on the cylinder inner surface served as a sliding part against the rotation shaft as a mating member. By providing the lubricant on the sliding part, low torque can be achieved and wear can be prevented. Consequently, the lifetime thereof can be extended largely. A well-known lubricant in this field can be utilized as the grease or the lubrication oil.

The examples of the sliding bearing are described with reference to FIGS. 4(a) to 4(c) through FIG. 7 as described above, however a whole configuration of the sliding bearing of the present invention is not limited to those examples. The sliding bearing may be modified as needed depending on a specification of the image forming apparatus to which the sliding bearing is applied. Further, the grooves or the holes shown in FIGS. 5(a) to 5(c) through FIG. 7 may be adopted together with another grooves or another holes.

Hereinafter, the bearing apparatus of the present invention will be described.

The bearing apparatus of the present invention is provided with the sliding bearing of the present invention described above, and a housing that houses the sliding bearing. The housing is served as, for example, a toner cartridge of the developer apparatus of the image forming apparatus. The sliding bearing supports a roller in the toner cartridge.

Figure 8:
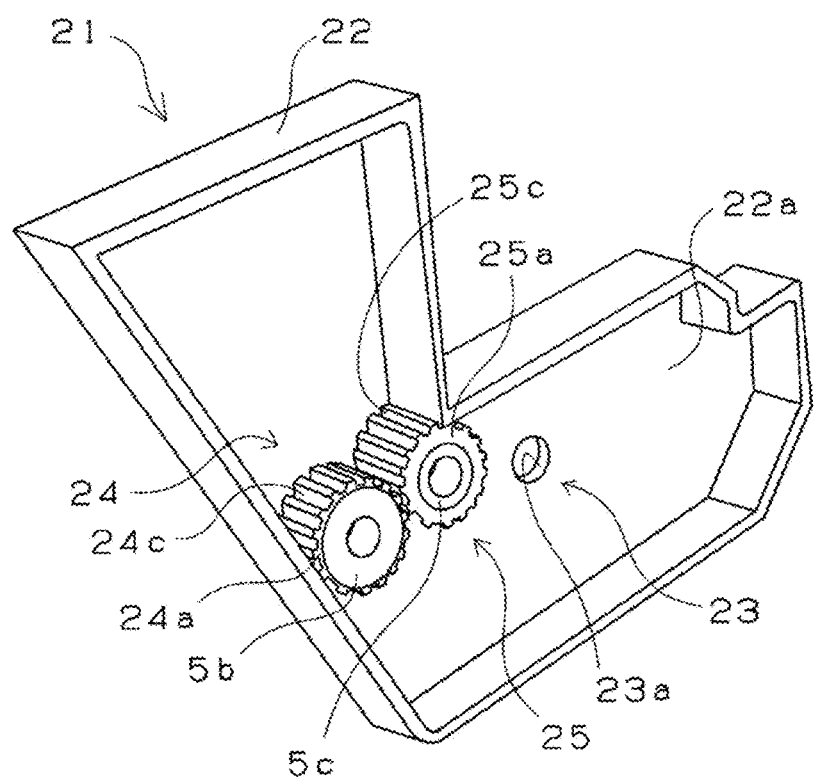
FIG. 8 is a view illustrating a housing seen from an inside thereof of a bearing apparatus according to the present invention.

One example of the bearing apparatus of the present invention will be described with reference to FIG. 8. FIG. 8 is a view illustrating a housing 22 seen from a side where each roller is housed (an inside of the housing). A bearing apparatus 21 is provided with the sliding bearings 5a (not shown), 5b and 5c, and the housing 22. The housing 22 has housing parts 23, 24 and 25 into which the sliding bearings 5a, 5b and 5c are inserted, respectively. FIG. 8 shows the housing parts 24 and 25 in which the sliding bearings 5b and 5c are assembled, respectively.

The housing part 23 is formed by a through hole 23a having a circular shape that penetrates an inner surface 22a and an outer surface of the housing 22. The sliding bearing 5a (see FIG. 3) is inserted into the through hole 23a. While, the housing part 24 is formed by a cylindrical member 24a formed to rise in an orthogonal direction from the inner surface 22a of the housing 22. The cylindrical member 24a has one end, which is not opened, in an axial direction thereof, so that the cylindrical member 24a does not penetrate the outer surface of the housing 22. The sliding bearing 5b is housed to be inserted into an inner peripheral part of the cylindrical member 24a. The housing part 25 is also formed by a cylindrical member 25a, similar to the housing part 24.

The sliding bearings 5a to 5c are assembled to the housing parts 23 to 25 described above, respectively. Further, the rotation shafts (see FIG. 3) are assembled to the sliding bearings, respectively. When the rotation shaft rotates, the rotation shaft temperature and the bearing temperature are increased due to the friction heat of the rotation shaft and sliding bearing. The temperature increase might cause the image failure.

The bearing apparatus of the present invention has, in addition to the sliding bearing formed of the resin composition described above, the housing having at least one of the groove for heat dissipation and the hole for heat dissipation on or around the housing part, and thereby the temperature increases of the rotation shaft temperature and the bearing temperature can be favorably suppressed. Further, by forming the groove or the hole for heat dissipation on the housing, the heat dissipation performance around the bearing can be enhanced without deteriorating the versatility of the sliding bearing.

Figure 9:
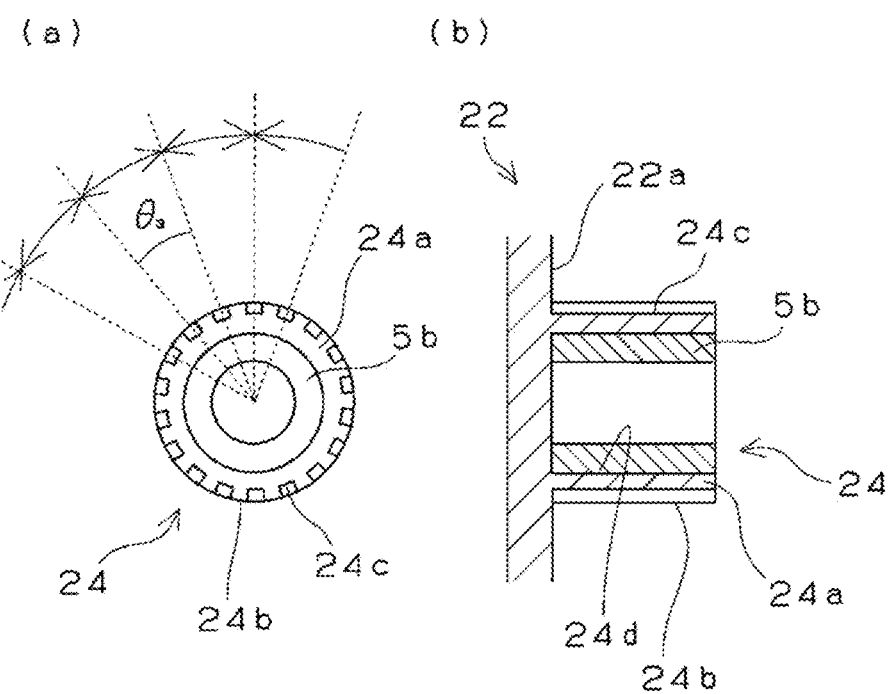
FIGS. 9(a) and 9(b) are a front view and the like illustrating a housing part formed by a cylindrical member.

In FIG. 8, the housing part 24 has a groove 24c on an outer peripheral part of the cylindrical member 24a. Similarly, the housing part 25 has a groove 25c on an outer peripheral part of the cylindrical member 25a. The below describes the housing part 24, however the same shall apply to the housing part 25. The groove 24c is continuously formed in a linear manner from one end to the other end of the cylindrical member 24a along an axial direction thereof. FIG. 9(a) is a view of the housing part formed by the cylindrical member seen from the axial direction thereof. FIG. 9(b) is an axial direction cross-sectional view of the housing part at a position of the groove. As shown in FIGS. 9(a) and 9(b), the housing part 24 houses the sliding bearing 5b such that a cylinder outer surface of the sliding bearing 5b is fitted to an inner peripheral part 24d of the cylindrical member 24a. In this case, the groove 24c for heat dissipation is formed on an outer peripheral part 24b, and the inner peripheral part that houses the sliding bearing 5b is formed in the same shape as an outer peripheral surface of the sliding bearing 5b. Consequently, the sliding bearing 5b can be stably housed.

As shown in FIG. 9(a), the grooves 24c are arranged on a surface of the outer peripheral part 24b to be shifted by regular angles $\theta_3$ as a center angle with respect to a center axis (axial line of the rotation shaft) of the cylindrical member 24a as the center. That is, the grooves 24c are formed at the same interval. The number of the grooves 24c is not especially limited, and therefore any number can be adopted.

A width of the groove 24c in the circumferential direction is preferable in a range of 1-5% of an inner diameter size of the inner peripheral part 24d. A specific groove width is preferable in, for example, a range of 0.2-1.0 mm depending on the number of the grooves. A depth of the groove 24c (radial direction depth) is preferable as deep as possible to such an extent not to affect the strength thereof, depending on a thickness of the cylindrical member 24a in the radial direction. The depth of the groove 24c denotes a distance between a groove formed surface (surface of the outer peripheral part 24b) and a groove bottom. In a case in which the groove is formed in a triangular groove or an arc groove, the depth of the deepest part of the groove is preferably set in the range described above.

Figure 10:
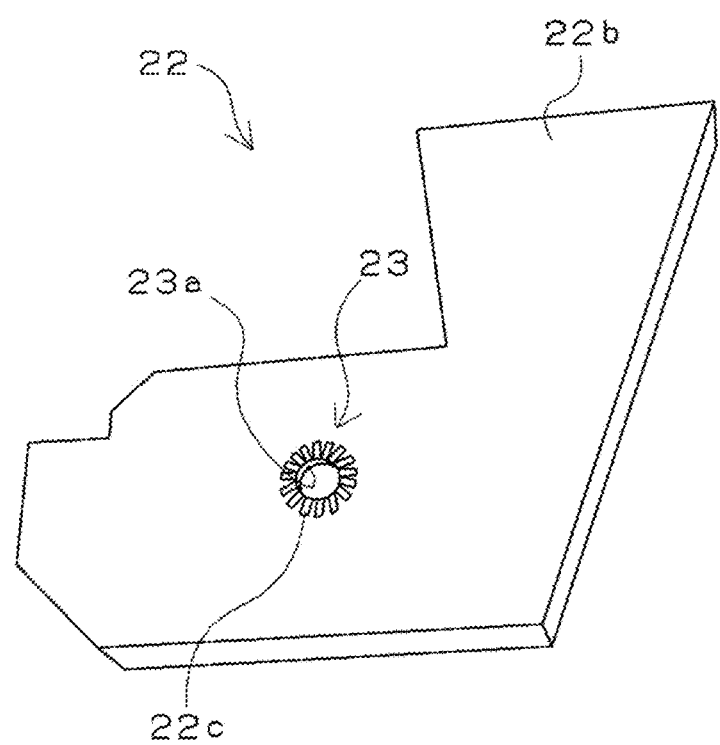
FIG. 10 is a view illustrating the housing seen from an outside thereof of the bearing apparatus according to the present invention.

FIG. 10 is a view of the housing 22 shown in FIG. 8 seen from an opposite side (an outside of the housing). A through hole 23a that forms the housing part 23 is opened to an outer surface 22b of the housing 22. A plurality of grooves 22c for heat dissipation is formed around the through hole 23a of the outer surface 22b radially in a direction from an inner diameter side to an outer diameter side of the through hole 23a. The groove 22c radially formed is served as a cooling fin, so that a temperature increasing speed of each of the rotation shaft temperature and the bearing temperature can be made slow in use and the temperature can be suppressed to be low in continuous use after the temperature has been increased.

FIG. 11(a) is a front view of the housing part formed by the through hole seen in an axial direction. FIG. 11(b) is an axial direction cross-sectional view of the housing part at a position of the groove. As shown in FIGS. 11(a) and 11(b), the housing part 23 houses the sliding bearing 5a such that a cylinder outer surface of the sliding bearing 5a is fitted to the through hole 23a. In FIGS. 11(a) and 11(b), one end of the groove 22c in a longitudinal direction is opened to the through hole 23a.

As shown in FIG. 11(a), the grooves 22c are arranged on an outer surface 22b to be shifted by regular angles $\theta_4$ as a center angle with respect to a center axis (axial line of the rotation shaft) of the through hole as the center. That is, the grooves 22c are formed at the same interval. In this case, in a case in which the angle $\theta_4$ is 20 degrees, eighteen grooves are arranged, while in a case in which the angle $\theta_4$ is 30 degrees, twelve grooves are arranged. The number of the grooves is not especially limited, however in order to increase the surface area to enhance the heat dissipation performance, ten or more grooves are preferable, and fifteen or more grooves are more preferable.

A width of the groove 22c in a circumferential direction is preferable in a range of 1-5% of an inner diameter size (not considering a notch or the like) of the through hole 23a. The specific groove width depends on the number of the grooves, and for example, the groove width is preferable in a range of 0.1-0.8 mm, more preferable in a range of 0.3-0.6 mm. A depth of the groove 22c (length in a depth direction of the housing 22) is preferable as deep as possible to such an extent not to affect the strength thereof, depending on a thickness of the housing 22. For example, in a case in which the thickness of the housing 22 is 1 mm, the depth is preferable in a range of 0.1-0.8 mm, more preferable in a range of 0.3-0.6 mm. The depth of the groove denotes a distance between a groove formed surface (outer surface 22b) and a groove bottom. In a case in which the groove is formed in a triangular groove or an arc groove, the depth of the deepest part of the groove is preferably set in the range described above.

In FIG. 10 and FIGS. 11(a) and 11(b), the groove 22c for heat dissipation is formed around the through hole 23a, however a hole for heat dissipation may be formed instead of the groove 22c. One example having a hole for heat dissipation is described with reference to FIGS. 12(a) and 12(b). FIG. 12(a) is a front view of a housing part on which a hole for heat dissipation is formed. FIG. 12(b) is an axial direction cross-sectional view of the housing part at a position of the hole. In FIGS. 12(a) and 12(b), a hole 22d for heat dissipation is independently formed from the through hole 23a. In this case, a shape of the through hole 23a that houses the sliding bearing 5a is kept, and therefore the sliding bearing 5a can be stably housed.

As shown in FIG. 12(a), a plurality of the holes 22d for heat dissipation is formed around the through hole 23a. A plurality of the holes 22d is concentrically formed with respect to a center axis of the through hole (axial line of the rotation shaft). Specifically, each two holes 22d formed in the radial direction are arranged to be shifted by regular angles $\theta_5$ as a center angle with respect to a center axis of the rotation shaft as the center. The hole 22d is formed as a non-through hole that does not penetrate an inner surface of the housing 22. A depth of the hole 22d (length in the depth direction of the housing 22) is, similar to that of the groove 22c described above, preferable as deep as possible to such an extent not to affect the strength thereof. The depth of the hole 22d denotes a distance between a groove formed surface (outer surface 22b) and a groove bottom.

The holes 22d may not be arranged in a regular manner as shown in FIGS. 12(a) and 12(b) but arranged in a random manner. A plane shape of each of the holes 22d is a circular shape, and the size is preferable in a range of ϕ0.1-1.5 mm. In the example shown in FIGS. 12(a) and 12(b), all holes 22d are identical in size, however the holes 22d having different sizes may be formed together.

Further, as another configuration, the groove for heat dissipation and the hole for heat dissipation may be formed together around the through hole. Specifically, the grooves may be arranged radially around the through hole and the holes may be arranged between the grooves. With this configuration, the heat dissipation performance can be further improved.

In either example shown in FIGS. 9(a) to 9(c), FIGS. 11(a) and 11(b), and FIGS. 12(a) and 12(b), a sectional shape in a depth direction of the groove or the hole may be determined as needed. For example, a rectangular groove or a rectangular hole having a rectangular section, an arc groove (R groove) or an arc hole having an arc section, or a triangular groove or a triangular hole having a triangular section may be adopted. By adopting the arrangement of the grooves or the holes shown in FIGS. 9(a) to 9(c), FIGS. 11(a) and 11(b), and FIGS. 12(a) and 12(b), the forced extraction in the injection molding is not caused in either of the rectangular shape, the arc shape and the triangular shape in the depth direction, and therefore the grooves or the holes are formed integrally with the housing easily and a forming process for forming the grooves or the holes afterward is not needed.

Figure 13:
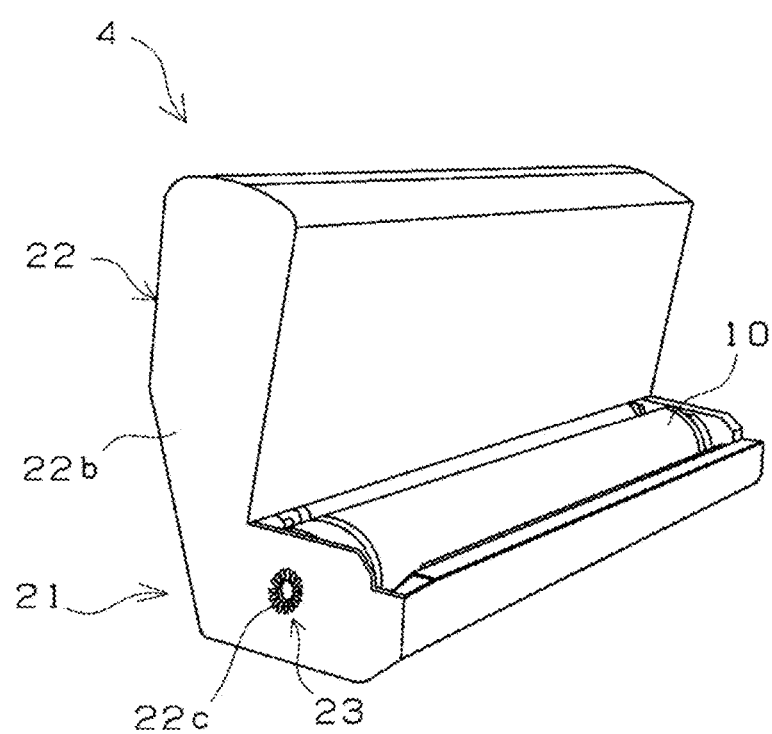
FIG. 13 is a perspective view illustrating an example of a toner cartridge.

One example of the toner cartridge formed by assembling the sliding bearing of the present invention and the rollers into the housing described above will be described with reference to FIG. 13. In FIG. 13, the developer roller 10 is assembled, and the sliding bearing that supports the rotation shaft of the developer roller 10 is assembled into the housing part 23 formed by a through hole. The grooves 22c for heat dissipation are formed radially around the through hole on the outer surface 22b of the housing 22. Although the illustration is omitted, in the toner cartridge 4 (housing), the sliding bearing that supports the rotation shaft of the stir roller is assembled into the housing part formed by the cylindrical member and the sliding bearing that supports the rotation shaft of the supply roller is assemble into the housing part formed by the cylindrical member. The grooves for heat dissipation are formed on each of the cylindrical members. In this way, the toner cartridge including the bearing apparatus 21 of the present invention is superior in the heat dissipation performance in each of the housing parts of the housing and thereby superior heat dissipation of the whole of the cartridge can be obtained.

A resin material is adopted as a housing material that forms the housing. As the resin material, an amorphous resin or a crystalline resin may be adopted. Of these resins, a resin composition, which is reinforced by glass fiber or the like, having a base resin formed by one or more kinds of thermoplastic resins selected from a polycarbonate resin, an ABS resin, a polyvinylchloride resin, a polystyrene resin, a methacryl resin, a polyethylene resin, a polypropylene resin, a PA resin, a POM resin, a polybutylene terephthalate resin, and a polyethylene terephthalate resin, is preferable.

The injection-moldable synthetic resin among those resins described above can efficiently form the housing part that houses the sliding bearing, and the grooves and the holes for heat dissipation, and it results in superior productivity. Of these resins, the thermoplastic resin is preferable because it is superior in productivity and moldability, and thereby the temperature increase of the rotation shaft due to the friction heat can be suppressed.

The resin composition described above does not especially limit a method for forming the housing. The housing may be formed by machining that processes the molded member obtained by means of compression molding or extrusion molding, however the injection molding is preferable from a viewpoint of productivity and uniformity of the quality. In particular, it is preferable that the housing is formed as an injection-molded member molded integrally with the housing part and the grooves or the holes for heat dissipation, by using the resin composition. While, the grooves or the holes may be formed afterward by means of machining.

The examples of the housing part of the housing in the toner cartridge are described with reference to FIG. 8 through FIGS. 12(a) and 12(b), however the shape of each of the housing and the housing part is not limited to those examples. The housing and the housing part may be modified as needed depending on a specification of the image forming apparatus to which the housing is applied. Further, the grooves or the holes for heat dissipation shown in FIG. 8 through FIGS. 12(a) and 12(b) may be adopted together with another grooves or another holes.

EXAMPLES

Hereinafter, the present invention will be further specifically described with examples. However, the present invention is not limited to the examples described below.
Test A
Configurations of the resin compositions of Examples and Comparative examples, and evaluation results of the tests are shown in Tables 1 and 2.

Example 1

A pellet is formed by compounding 80 vol % of the injection-moldable ultrahigh molecular weight PE resin powder (weight average molecular weight: 250,000 to 600,000) as a base resin, 15 vol % of the PTFE resin as an additive, and 5 vol % of a calcium carbonated whisker, which is an acicular inorganic filler having the Mohs hardness of 3 or less, mixing and melt kneading the powder. And then, a test piece for a friction and wear test and a test piece for a physical property measuring test are molded by injection-molding the pellet.
Friction and Wear Test The test is performed by using a radial type friction and wear test. A cylindrical test piece of $\phi 12 \times \phi 8 \times t 10$ mm is adopted as the friction and wear test piece. Two kinds of the rotation shafts formed of SUS 303 and POM resin (no filler) respectively are adopted as the mating shaft. The test condition using the SUS shaft is set to surface pressure of 0.7 MPa, speed of 0.15 m/s, rotation time of 30 minutes, and test starting temperature of 28° C.±1° C., under a non-lubricated environment. The surface pressure of 0.7 MPa is three times or more as large as the surface pressure in the actual use circumstance. The test condition using the POM resin shaft is set to the same as that using the SUS shaft, except that the surface pressure is set to 0.2 MPa. In the above test, the rotation time is set to 30 minutes as the time for the shaft temperature being saturated. As the shaft temperature, a temperature of an end surface of the shaft is measured using an infrared non-contact thermometer. A kinetic friction coefficient is measured using a kinetic friction measuring device, and also the attackability to the mating shaft is evaluated.

Further, in order to evaluate the friction property under more severe condition in the friction and wear test, the test condition using the SUS shaft is set to the surface pressure of 1.0 MPa, the speed of 0.25 m/s, the rotation time of 30 minutes, and test starting temperature of 28° C.±1° C., under a non-lubricated environment. The surface pressure of 1.0 MPa is five times or more as large as the surface pressure in the actual use circumstance. The speed of 0.25 m/s is one and half times or more as large as the surface pressure in the actual use circumstance.
Physical Property Measuring Test The bending elastic modulus of the test piece for the physical property measuring test is measured based on JIS K7171. Further, Rockwell hardness is measured based on R-scale of JIS K 7202.

Example 2 to Example 5

A test piece of each Example is molded similar to the test piece of Example 1, except that the base resin, which is the same as Example 1, the additive and the inorganic filler shown in Table 1 are compounded at each compounding ratio shown in Table 1. The test similar to Example 1 is performed to each test piece.

Comparative Example 1 to Comparative Example 6

A test piece of each Comparative example is molded similar to Example 1, except that the base resin, which is the same as Example 1, the additive and the inorganic filler shown in Table 2 are compounded at each compounding ratio shown in Table 2. The test similar to Example 1 is performed to each test piece.

TABLE 1

| | | | Example 1 | Example 2 | Example 3 | Example 4 | Example 5 |
|---|---|---|---|---|---|---|---|
| Composition (vol %) | Base resin | Ultrahigh molecular weight PE resin | 80 | 65 | 83.5 | 90 | 70 |
| | Additive | Zinc stearate | — | — | — | — | — |
| | | PTFE resin | 15 | 15 | 15 | 5 | 25 |
| | Inorganic filler (shape, Mohs hardness) | Calcium carbonate (acicular shape, 2-3) | 5 | 20 | 1.5 | 5 | 5 |
| | | Calcium carbonate (fusiform shape, 2-3) | — | — | — | — | — |
| | | Calcium metasilicate (acicular shape, 4.5-5) | — | — | — | — | — |
| Friction and wear test | SUS shaft (0.7 MPa, 0.15 m/s) | Shaft temperature (° C.) | 46 | 47 | 46 | 48 | 46 |
| | | Kinetic friction coefficient ($\mu$) | 0.08 | 0.08 | 0.08 | 0.1 | 0.08 |
| | | Bearing wear amount (mm) | 0.011 | 0.007 | 0.014 | 0.015 | 0.010 |
| | | Attackablity to SUS shaft | No | No | No | No | No |
| | POM resin shaft (0.2 MPa, 0.15 m/s) | Shaft temperature (° C.) | 33 | 35 | 34 | 35 | 32 |
| | | Kinetic friction coefficient ($\mu$) | 0.09 | 0.12 | 0.11 | 0.13 | 0.08 |
| | | Attackablity to POM resin shaft | No | No | No | No | No |
| | SUS shaft (1.0 MPa, 0.25 m/s) | Shaft temperature (° C.) | 59 | 61 | 60 | 62 | 60 |
| | | Kinetic friction coefficient ($\mu$) | 0.07 | 0.08 | 0.09 | 0.1 | 0.08 |
| | | Bearing wear amount (mm) | 0.019 | 0.016 | 0.025 | 0.028 | 0.029 |
| | | Attackablity to SUS shaft | No | No | No | No | No |
| Physical property test | | Bending elastic modulus (GPa) | 2.6 | 3.5 | 2.3 | 2.7 | 2.5 |
| | | Rockwell hardness (R scale) | 52 | 59 | 49 | 53 | 51 |
| | | Rockwell hardness/Bending elastic modulus | 20 | 17 | 21 | 20 | 20 |

TABLE 2

| | | | Comparative example 1 | 2 | 3 | 4 | 5 | 6 |
|---|---|---|---|---|---|---|---|---|
| Composition (vol %) | Base resin | Ultrahigh molecular weight PE resin | 97 | 90 | 80 | 80 | 80 | 100 |
| | Additive | Zinc stearate | 3 | 10 | — | — | — | — |
| | | PTFE resin | — | — | 20 | 15 | 15 | — |
| | Inorganic filler (shape, Mohs hardness) | Calcium carbonate (acicular shape, 2-3) | — | — | — | — | — | — |
| | | Calcium carbonate (fusiform shape, 2-3) | — | — | — | 5 | — | — |
| | | Calcium metasilicate (acicular shape, 4.5-5) | — | — | — | — | 5 | — |
| Friction and wear test | SUS shaft (0.7 MPa, 0.15 m/s) | Shaft temperature (° C.) | 49 | 50 | 52 | 52 | 51 | 58 |
| | | Kinetic friction coefficient ($\mu$) | 0.09 | 0.11 | 0.13 | 0.13 | 0.12 | 0.17 |
| | | Bearing wear amount (mm) | 0.019 | 0.027 | 0.022 | 0.2 | 0.015 | 0.025 |

TABLE 2-continued

|  |  | Comparative example | | | | | |
|---|---|---|---|---|---|---|---|
|  |  | 1 | 2 | 3 | 4 | 5 | 6 |
|  | | Attackablity to SUS shaft | No | No | No | No | Yes | No |
| | POM resin shaft (0.2 MPa, 0.15 m/s) | Shaft temperature (° C.) | 33 | 34 | 35 | 37 | 42 | 39 |
| | | Kinetic friction coefficient (μ) | 0.09 | 0.11 | 0.13 | 0.16 | 0.23 | 0.21 |
| | | Attackablity to POM resin shaft | No | No | No | No | Yes | No |
| | SUS shaft (1.0 MPa, 0.25 m/s) | Shaft temperature (° C.) | 65 | 66 | 67 | 67 | 71 | 69 |
| | | Kinetic friction coefficient (μ) | 0.08 | 0.08 | 0.11 | 0.11 | 0.18 | 0.13 |
| | | Bearing wear amount (mm) | 0.049 | 0.058 | 0.045 | 0.042 | 0.037 | 0.052 |
| | | Attackablity to SUS shaft | No | No | No | No | Yes | No |
| Physical property test | | Bending elastic modulus (GPa) | 1.9 | 1.8 | 2.0 | 2.3 | 3.2 | 2.1 |
| | | Rockwell hardness (R scale) | 46 | 44 | 48 | 51 | 54 | 48 |
| | | Rockwell hardness/Bending elastic modulus | 24 | 24 | 24 | 22 | 17 | 23 |

As shown in Table 1, in each of Examples 1 to 5 that adopts the combination of the ultrahigh molecular weight PE resin, the PTFE resin, and the acicular inorganic filler having the Mohs hardness of 3 or less (calcium carbonate whisker), the friction coefficient to each of the SUS shaft and the POM resin shaft can be suppressed to be low and the increase of the shaft temperature thereof can be suppressed. Further, relating to the SUS shaft, the friction coefficient can be suppressed to be low and the bearing wear amount can be suppressed to 0.030 mm or less under the condition of 0.7 MPa and 0.15 m/s and also the condition, which is a high speed and high surface pressure condition, of 1.0 MPa and 0.25 m/s. The increase of the bearing wear amount denotes the increase of the contact surface with the rotation shaft, and as the contact surface with the rotation shaft is increased, the friction coefficient is apt to be large. By adding the acicular inorganic filler having the Mohs hardness of 3 or less (calcium carbonate whisker), the elastic modulus and the wear resistance are improved.

According to Examples 1, 4 and 5 having the different compounded amounts of the PTFE resin, a low friction effect can be derived between 5-25 vol % in the compounded amount. However, in a case in which the compounded amount of the PTFE resin exceeds 25 vol %, the flowability in melting becomes high, and therefore it might be difficult to injection-mold many products at one time. Furthermore, the wear resistance might be deteriorated under the high speed and heavy load condition of 1.0 MPa and 0.25 m/s.

In Example 2 that contains 20 vol % of the calcium carbonate whisker, sufficient low friction and wear resistance can be obtained. Generally, the inorganic filler itself does not derive sliding performance and therefore the inorganic filler that is compounded too much derives high friction like a brake component. Thus, it is considered that 20 vol % is near an upper limit of its acceptable compounded amount. While, Example 3 in which 1.5 vol % of the calcium carbonate whisker is compounded also shows the wear resistance improving effect. However, it is considered that approximately 1.5 vol % is a lower limit of the compounded amount that derives a reinforcing effect.

As shown in Table 2, in each of Comparative examples 1 and 2 that adopts zinc stearate as an additive, superior result is obtained against the SUS shaft under the condition of 0.7 MPa and 0.15 m/s and against the POM resin shaft, while the shaft temperature is apt to be relatively high against the SUS shaft under the condition of 1.0 MPa and 0.25 m/s. This is considered that the contact area with the shaft is increased due to the progress of wear and thereby the friction force is increased. Although the friction coefficient is low, the friction heat associated with the friction coefficient is considered as relatively large. Similarly, also in Comparative example 3 that does not contain the acicular inorganic filler having the Mohs hardness of 3 or less, the shaft temperature is apt to be increased when used under the high speed and heavy load condition.

Comparative example 4 that contains the inorganic filler, which does not have an acicular shape, having the Mohs hardness of 3 or less (aggregated calcium carbonate) does not derive the wear resistance improving effect sufficiently, compared to the configuration that contains the inorganic filler having the acicular shape (Example 1). The reason thereof is considered that the actual contact area with the rotation shaft is increased. Further, the friction coefficient is not small to such an extent of the configuration that contains the inorganic filler having the acicular shape.

Comparative example 5 that contains a silicate mineral, which is an acicular inorganic filler, having the Mohs hardness of 4.5-5 is effective to improve the elastic modulus, however the attackability thereof to the mating shaft is remarkable. Further, the wear resistance is relatively superior, however the shaft temperature is high because the friction coefficient is large. In particular, the SUS shaft, which is a mating shaft, is remarkably damaged under the condition of 1.0 MPa and 0.25 m/s.

Test B

A shaft temperature suppressing effect with respect to the structure having the groove or the hole for heat dissipation on the housing that houses the sliding bearing is evaluated.

Comparative Example 7

Figure 11:
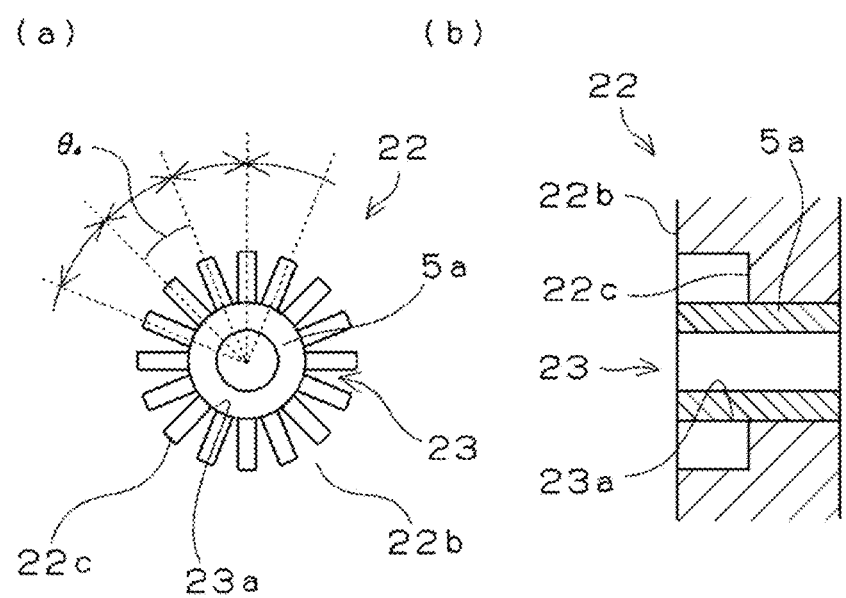
FIGS. 11(a) and 11(b) are a front view and the like illustrating the housing part formed by a through hole.

The sliding bearing adopts a resin composition in which the POM resin is filled with wax. All sliding bearings of Comparative examples 7 to 9 adopt the same resin composition described above. In Comparative example 7, the housing for a small radial test machine to which the sliding bearing is assembled is obtained by molding the resin composition in which an ABS resin is filled with 30 mass % of glass fiber by using an injection test machine. A thickness of the housing is 2 mm. A through hole to which the sliding bearing is assembled is φ10 mm. As shown in FIGS. 11(*a*) and 11(*b*), sixteen rectangular grooves for heat dissipation, each of which has a width of 0.5 mm and a depth of 0.5 mm, are radially formed by an additional processing, on the housing within a range of an outer diameter of φ20 mm. The sliding bearing described above is assembled to the housing so as to obtain a bearing apparatus.

Comparative Example 8

Figure 12:
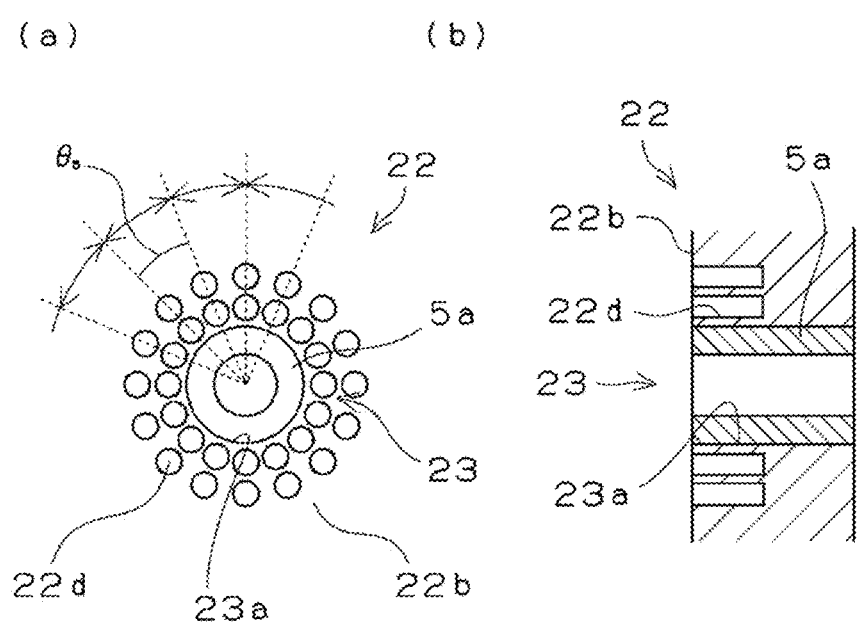
FIGS. 12(a) and 12(b) are a front view and the like illustrating the housing part formed by a through hole.

In Comparative example 8, the housing having the holes for heat dissipation is formed. At first, the housing for the small radial test machine is obtained by means of injection molding using the same resin composition as Comparative example 7. A thickness of the housing is 2 mm. A through hole to which the sliding bearing is assembled is φ10 mm. After that, as shown in FIGS. 12(*a*) and 12(*b*), thirty two holes, each of which has a diameter of φ2 mm and a depth of 0.5 mm, are radially formed by an additional processing. The sliding bearing is assembled to the housing so as to obtain a bearing apparatus.

Example 6

The sliding bearing adopts the resin composition of Example 1. This sliding bearing is assembled to the housing of Comparative example 7 in which the grooves for heat dissipation are formed so as to obtain a bearing apparatus.

Example 7

Example 7 adopts the housing of Comparative example 8 in which the holes for heat dissipation are formed. The sliding bearing adopts the resin composition of Example 1, similar to Example 6. This sliding bearing is assembled to the housing described above so as to obtain a bearing apparatus.

Comparative Example 9

Figure 17:
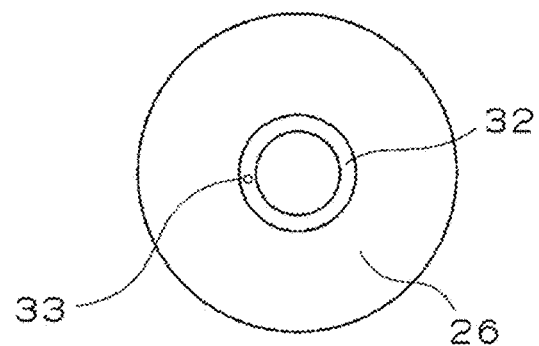
FIG. 17 is a view illustrating a sliding bearing assembled to a housing according to Comparative example 9.

In Comparative example 9, the housing for the small radial test machine is obtained by means of injection molding using the same resin composition as Comparative example 7. In Comparative example 9, the grooves or the holes are not formed, and therefore a housing having a normal shape is adopted. FIG. 17 shows a sliding bearing 32 as a test bearing, assembled to a housing 26 of Comparative example 9.

Figure 14:
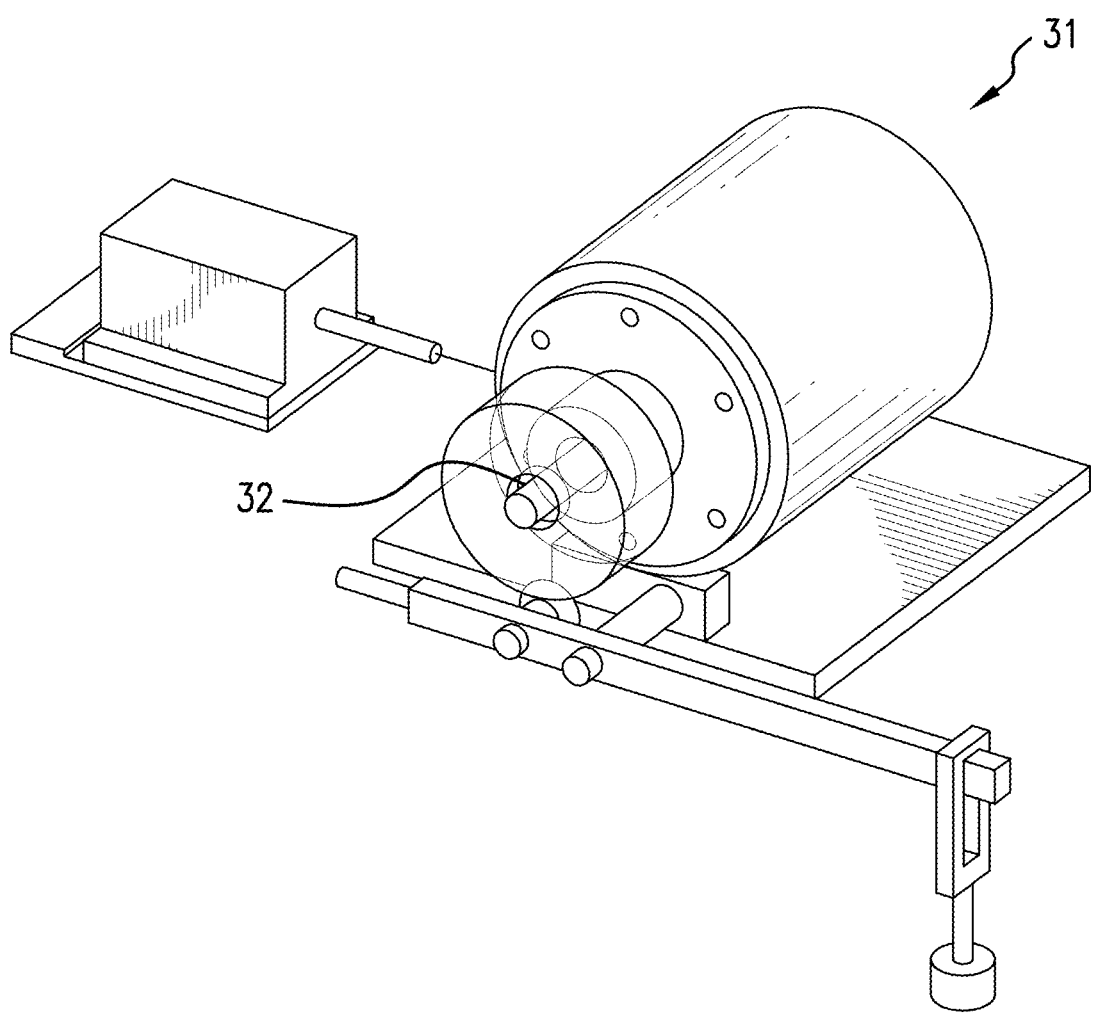
FIG. 14 is a view illustrating a schematic configuration of a small radial test machine.
Figure 15:
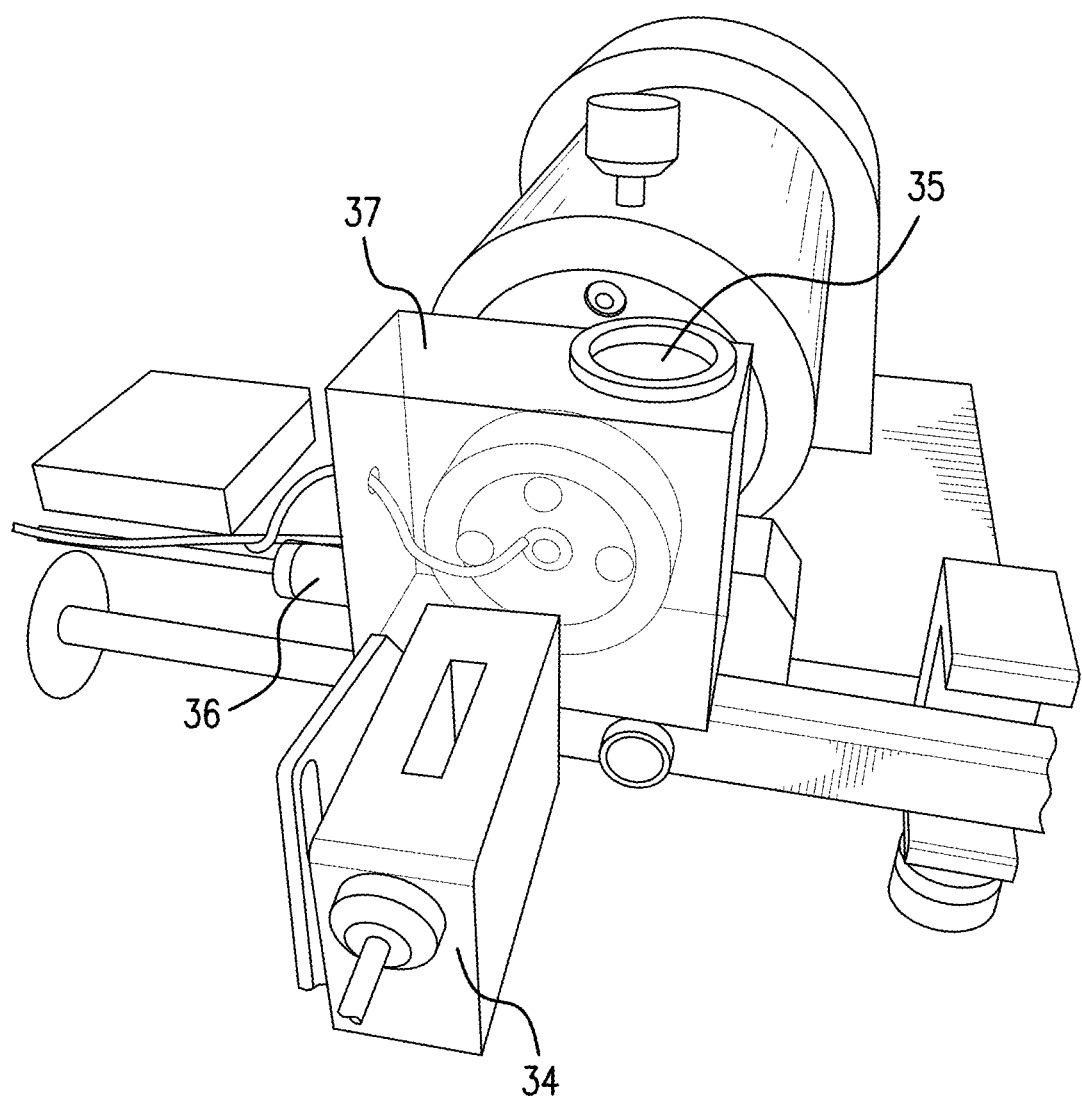
FIG. 15 is a view illustrating a test method according to Test B.
Figure 16:
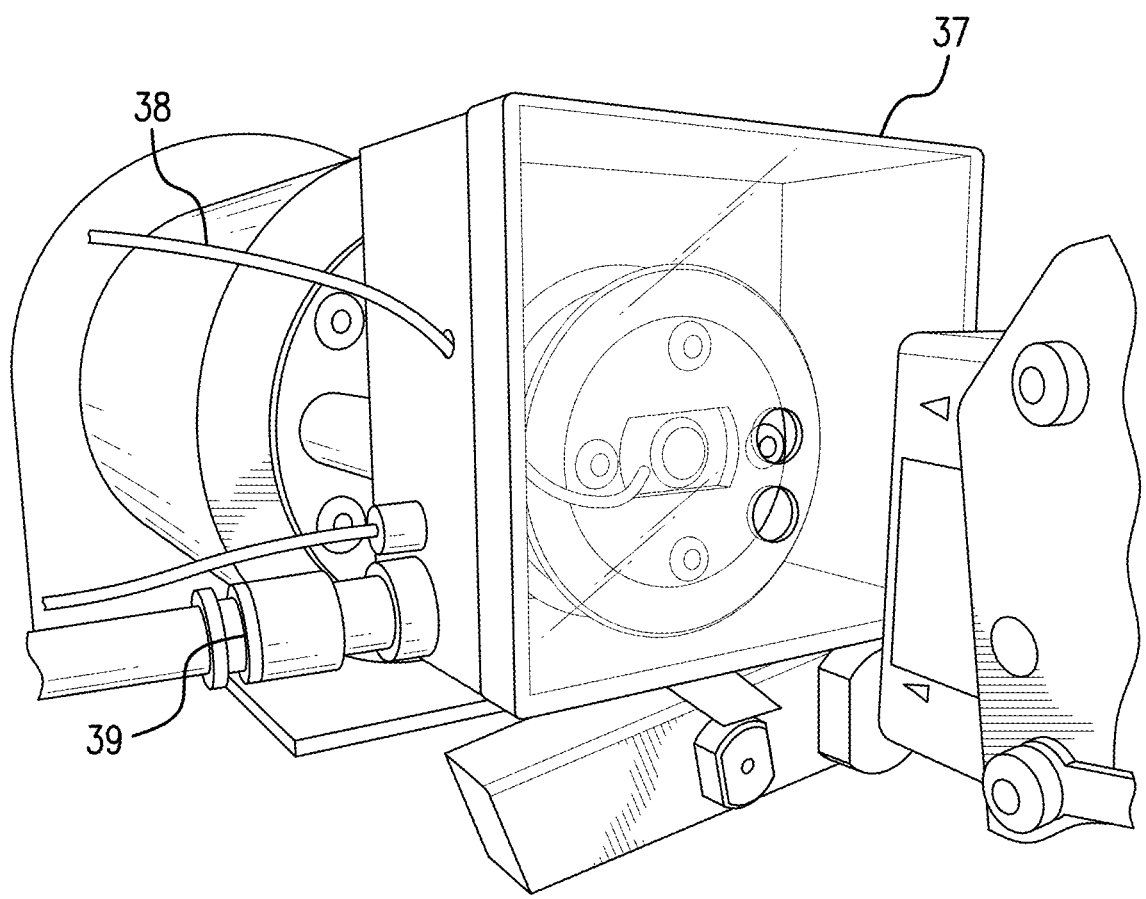
FIG. 16 is a view illustrating the test method according to Test B.

The bearing temperature and the rotation shaft temperature of each of the formed bearing apparatuses are measured as time elapses using a small radial test machine 31 shown in FIG. 14. A thermocouple insertion hole 33 (see FIG. 17) having a diameter of φ0.5 mm for measuring the friction heat around the sliding part of the sliding bearing as the bearing temperature is formed on an inner diameter end surface of the sliding bearing 32. Further, as shown in FIG. 15, an end surface of the rotation shaft is continuously measured in a rotating state as the rotation shaft temperature by using an infrared non-contact thermometer 34. The temperature of the sliding bearing 32 during the test is measured using a thermocouple 38 inserted into the thermocouple insertion hole 33. Considering that the sliding bearing is to be arranged in the toner cartridge, a part of the small radial test machine where the sliding bearing is assembled is covered with an acryl resin box 37, an air inlet 35 is formed on an upper part of the acryl resin box 37, and a suction hole 36 is formed at a lower part on a side surface of the acryl resin box 37, so that an air flow in the acryl box 37 is reproduced using a suction apparatus 39 (see FIG. 15 and FIG. 16).

Figure 18:
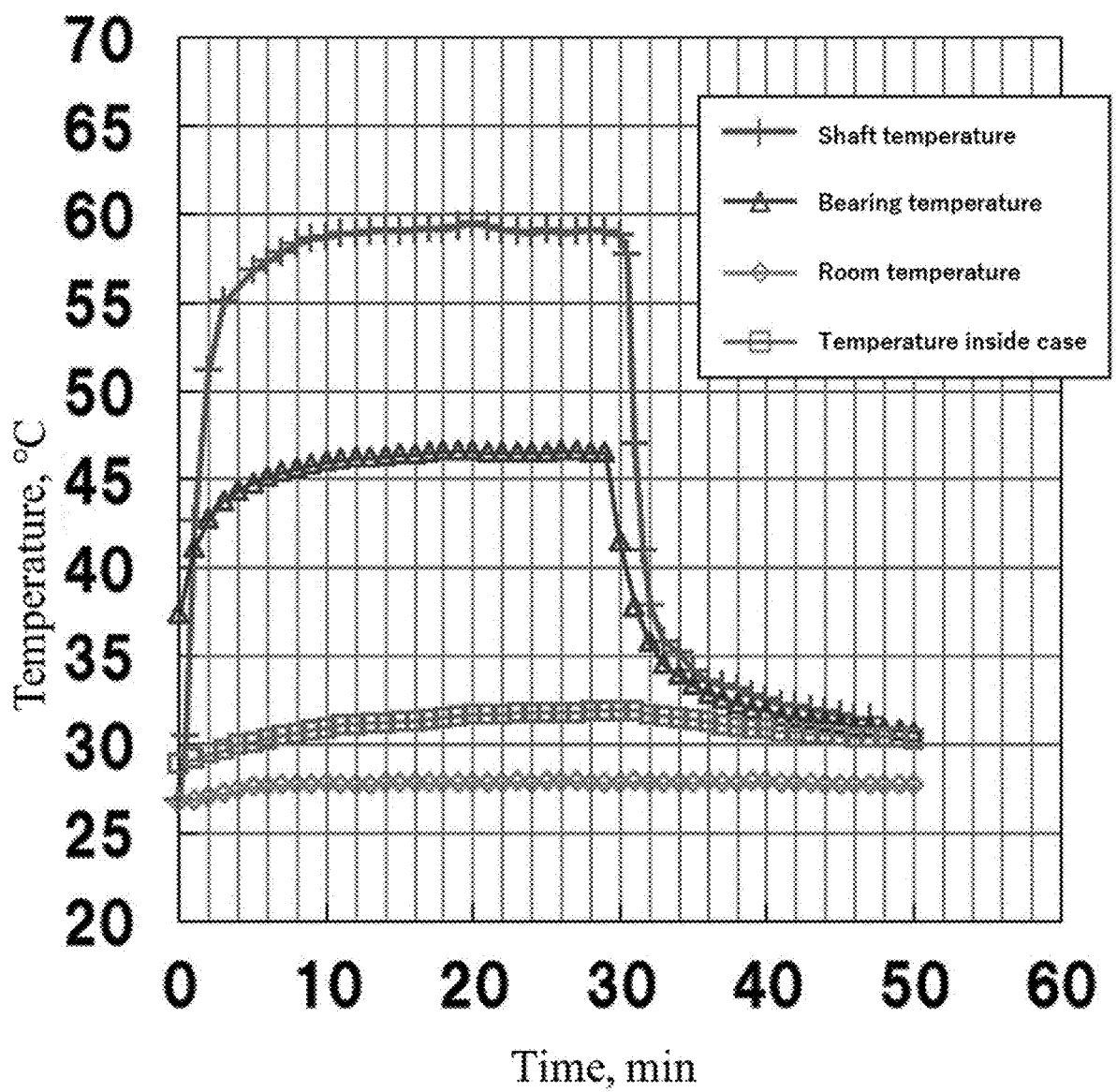
FIG. 18 is a graph illustrating changes with time of a bearing temperature, a rotation shaft temperature, and the like according to Comparative example 7.

The test condition using the SUS shaft having a diameter of φ8 mm as the rotation shaft is surface pressure of 0.7 MPa, speed of 0.15 m/s, rotation time of 30 minutes, and test starting temperature of 28° C.±1° C., under a non-lubricated environment. The results of the tests of measuring the temperature are shown in FIG. 18 (Comparative example 7), Comparative example 8, and Comparative example 9, respectively. Further, all of the measurement results of the bearing temperature and the rotation shaft temperature are shown in Table 3.

TABLE 3

|  | Bearing temperature (° C.) | Rotation shaft temperature (° C.) |
| --- | --- | --- |
| Example 6 | 39.5 | 45.5 |
| Example 7 | 39.0 | 44.5 |
| Comparative example 7 | 47 | 59 |
| Comparative example 8 | 42.5 | 61 |
| Comparative example 9 | 53.0 | 63.0 |

As shown in FIG. 18 or in Table 3, in a configuration in which the sliding bearing is arranged in the toner cartridge, Comparative examples 7 and 8 are superior in heat dissipation performance compared to Comparative example 9. Comparative example 7 is lower in the bearing temperature by 6° C. and lower in the rotation shaft temperature by 4° C. than those of Comparative example 9. While, each of Examples 6 and 7 that combines the housing for which the grooves or the holes for heat dissipation are formed and the sliding bearing formed of a predetermined resin composition can suppress heat generation of the sliding bearing itself, and accordingly Examples 6 and 7 are further effective in the suppression of the bearing temperature and the rotation shaft temperature. The predetermined resin composition is preferably a non-oil-impregnated resin composition that contains 65 vol % or more of the ultrahigh molecular weight PE resin, 5 vol % or more of the PTFE resin, and 5 vol % or more of the acicular inorganic filler having the Mohs hardness of 3 or less, from a viewpoint of the heat dissipation performance.

INDUSTRIAL APPLICABILITY

The sliding bearing of the present invention is superior in low friction and is able to suppress the increase of the shaft temperature in a continuous use, and thereby the sliding bearing of the present invention can be widely adopted as a sliding bearing that supports the rotation shaft of the roller in the image forming apparatus such as a copier, a multifunction machine, a printer, and a fax machine.

REFERENCE SIGNS LIST

1: charge unit
2: photoreceptor drum
3: laser beam
4: cartridge unit
5: sliding bearing
6: paper
7: fuser roller 8: pressure roller
9: charger
10: developer roller
11: supply roller
12: stir roller
13: rotation shaft
14: sliding bearing
15: sliding bearing
16: sliding bearing
17: sliding bearing
21: bearing apparatus
22: housing
23: housing part
24: housing part
25: housing part
26: housing
31: small radial test machine
32: sliding bearing
33: thermocouple insertion hole
34: non-contact thermometer
35: air inlet
36: suction hole
37: acryl resin box
38: thermocouple
39: suction apparatus

The invention claimed is:

1. A sliding bearing of which a cylinder inner surface supports a rotation shaft in a rotatable manner, the sliding bearing being formed of a molded member of a non-oil-impregnated resin composition that does not contain oil,
wherein the resin composition contains an injection-moldable ultrahigh molecular weight polyethylene resin as a base resin, a polytetrafluoroethylene resin as an additive, and an acicular inorganic filler having Mohs hardness of 3 or less,
wherein the resin composition contains 65 vol % or more of the ultrahigh molecular weight polyethylene resin, 10-25 vol % of the polytetrafluoroethylene resin, and 1-20 vol % of the acicular inorganic filler, based on the whole of the resin composition,
wherein an average particle diameter of the polytetrafluoroethylene resin is 30 μm or less,
wherein a ratio of Rockwell hardness R-scale to bending elastic modulus measured in GPa of the resin composition is in a range between 17 and 21.

2. The sliding bearing according to claim 1, wherein the sliding bearing is used in a developer unit of an image forming apparatus.

3. The sliding bearing according to claim 1, wherein the sliding bearing is an injection-molded member integrally molded from the resin composition.

4. The sliding bearing according to claim 1, wherein the sliding bearing is a cylindrical sliding bearing with a flange formed on a cylinder end part thereof, and
wherein a recess or a projection for heat dissipation is formed on a surface of the flange.

5. The sliding bearing according to claim 4, wherein at least one of a groove and a hole is formed as the recess.

6. The sliding bearing according to claim 5, wherein the groove is formed on the surface of the flange, and
wherein a plurality of the grooves is radially formed from an inner diameter side toward an outer diameter side of the flange.

7. The sliding bearing according to claim 6, wherein the hole is formed on the surface of the flange, and
wherein the hole is formed between the grooves which are arranged radially.

8. The sliding bearing according to claim 5, wherein the hole is formed on the surface of the flange, and
wherein a plurality of the holes is concentrically formed with respect to a cylinder center axis.

9. A bearing apparatus comprising the sliding bearing according to claim 1, and a housing that houses the sliding bearing,
wherein the housing has a housing part into which the sliding bearing is inserted, and at least one of a groove for heat dissipation and a hole for heat dissipation on or around the housing part.

10. The bearing apparatus according to claim 9, wherein the housing part has a circular through hole that penetrates the housing, and
wherein the housing has a plurality of the grooves that is formed radially from the through hole, around the through hole on one end surface on which the through hole is formed.

11. The bearing apparatus according to claim 9, wherein the housing part has a through hole that penetrates the housing, and
wherein the housing has a plurality of the holes that does not penetrate the housing, around the through hole on one end surface on which the through hole is formed.

12. The bearing apparatus according to claim 9, wherein the housing part has a cylindrical member with an inner peripheral part into which the sliding bearing is inserted, and the groove formed on an outer peripheral part of the cylindrical member, and
wherein a plurality of the grooves is formed linearly or spirally from one end to the other end along an axial direction of the cylindrical member.

13. An image forming apparatus comprising the sliding bearing according to claim 1, and a roller or a shaft supported by the sliding bearing.

* * * * *